United States Patent
Wigren et al.

(10) Patent No.: US 11,129,055 B2
(45) Date of Patent: Sep. 21, 2021

(54) FLOW CONTROL IN WIRELESS COMMUNICATION SYSTEMS

(71) Applicant: Telefonaktiebolaget LM Ericsson (publ), Stockholm (SE)

(72) Inventors: Torbjörn Wigren, Uppsala (SE); Martin Skarve, Enebyberg (SE); Mikael Wittberg, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/771,430

(22) PCT Filed: Dec. 12, 2017

(86) PCT No.: PCT/SE2017/051252
§ 371 (c)(1),
(2) Date: Jun. 10, 2020

(87) PCT Pub. No.: WO2019/117765
PCT Pub. Date: Jun. 20, 2019

(65) Prior Publication Data
US 2021/0076262 A1    Mar. 11, 2021

(51) Int. Cl.
*H04W 28/12* (2009.01)
*H04W 28/08* (2009.01)
(Continued)

(52) U.S. Cl.
CPC ......... *H04W 28/12* (2013.01); *H04L 43/0864* (2013.01); *H04L 47/283* (2013.01); *H04W 28/0908* (2020.05)

(58) Field of Classification Search
CPC ... H04L 43/0864; H04L 47/283; H04L 47/30; H04W 28/0908; H04W 28/10; H04W 28/12
(Continued)

(56) References Cited

U.S. PATENT DOCUMENTS

| | | | |
|---|---|---|---|
| 2011/0058475 A1* | 3/2011 | Nilsson | H04L 47/14 370/235 |
| 2018/0332496 A1* | 11/2018 | Dudda | H04W 28/08 |

(Continued)

FOREIGN PATENT DOCUMENTS

| | | | |
|---|---|---|---|
| WO | 2013167647 A1 | 11/2013 | |
| WO | WO-2013167647 A1 * | 11/2013 | ........... H04L 47/283 |

(Continued)

OTHER PUBLICATIONS

Wigren, Torbjörn, et al., "Globally Stable Wireless Data Flow Control", IEEE, 2016, pp. 1-10.

*Primary Examiner* — Robert J Lopata
(74) *Attorney, Agent, or Firm* — Murphy, Bilak & Homiller, PLLC

(57) ABSTRACT

The proposed technology generally relates to a method for controlling multi-point data transmission between a primary node (100) and a User Equipment, UE, via secondary nodes (101, 102). The method comprises the steps of obtaining (S1) Round-Trip Time, RTT, values ($T_{RTT,backhaul,i}$) between a primary node (100) and two or more secondary nodes (101, 102). The method further comprises determining (S2) a time value relationship ($\alpha_i$) between uplink and downlink for each of the obtained RTT values; determining (S3) a first queue dwell time ($T_{ref,queue,1}$) in a first secondary node (101) of the two or more secondary nodes (101, 102); and determining (S4) a second queue dwell time ($T_{ref,queue,2}$) in a second secondary node (102) of the two or more secondary nodes (101, 102), the second queue dwell time ($T_{ref,queue,2}$) being determined at least partly based on the RTT values ($T_{RTT,backhaul,i}$), the time value relationship ($\alpha_i$) and the determined first queue dwell time ($T_{ref,queue,1}$). The method further comprises initiating control (S5) of the first and (Continued)

second queue dwell times for synchronized data arrival in the UE.

15 Claims, 12 Drawing Sheets

(51) Int. Cl.
*H04L 12/26* (2006.01)
*H04L 12/841* (2013.01)

(58) Field of Classification Search
USPC .......................................................... 370/329
See application file for complete search history.

(56) References Cited

U.S. PATENT DOCUMENTS

| | | | |
|---|---|---|---|
| 2019/0053181 A1* | 2/2019 | Wigren | H04W 56/0015 |
| 2019/0208444 A1* | 7/2019 | Wigren | H04L 1/0072 |
| 2019/0230555 A1* | 7/2019 | Wigren | H04W 28/12 |
| 2019/0306066 A1* | 10/2019 | Wigren | H04L 43/0864 |

FOREIGN PATENT DOCUMENTS

| | | | |
|---|---|---|---|
| WO | 2017076826 A1 | 5/2017 | |
| WO | 2017162270 A1 | 9/2017 | |
| WO | 2017209661 A1 | 12/2017 | |

\* cited by examiner

FLOW CONTROL IN WIRELESS COMMUNICATION SYSTEMS

TECHNICAL FIELD

The proposed technology generally relates to flow control in wireless communication systems and in particular to flow control in multi-point transmission wireless communication systems.

BACKGROUND

Today's wireless cellular systems have been designed to handle very efficient data transfer between a single user (UE) and a single base station, denoted eNB in 4G systems. These solutions are sufficient at today's carrier frequencies close to 1-2 GHz. In future fifth generation cellular system (5G) a shift towards higher carrier frequencies is a necessity, to be able to utilize the available spectrum, thereby achieving a higher capacity overall.

A consequence of the move to higher carrier frequencies is that the radio propagation is transformed from "diffuse" scattering to beamlike propagation. This leads to sharp diffraction effects and increasingly heavy radio shadowing behind obstacles. This makes it more difficult to obtain uniform coverage from a single 5G base station (denoted eNB in case of LTE evolution and NR in case of the new access in standardization for 5G at higher carrier frequencies). The implication is a need to transmit from multiple non-co-located transmit points, to cover a single cell. Such massive multi-point transmission is generally expected to become a cornerstone in future 5G radio access.

Note also that 5G technology is based on the concept of ultra-lean transmission. This means that control channel data and system information to a very large extent is to be carried by user data, in a piggy backed fashion. For this reason, continuous transmission is in some sense needed in order to keep a multi-point transmission path active.

It should be noted that multi-point transmission is also considered for the present 4G LTE system, however the need and also the massiveness of the solutions for 4G are believed to be less than those of future 5G cellular systems. The same is true for the IEEE standards of which WIFI constitute a major part.

As an example, the internet of things (IoT) is expected to grow rapidly when the new 5G wireless standards are introduced. Some of the new IoT applications will require remote control over the wireless interfaces, which puts networked control systems (NCS) at the focal point. Some expected applications include e.g. automotive safety, virtual reality with force feedback, and manufacturing plants with feedback controlled industrial robots. In the past, a weak point of cellular wireless systems has been their high latency, a fact that is addressed in the ongoing 5G wireless standardization. However, it is foreseen that delay tolerant networked control will remain a critical component in this equation.

One consequence of the above facts is a need for the wireless community to address the details of delay control between different transmission points. For example, in case the multi-point transmissions are not properly delay controlled, coordinated wireless transmission schemes may become less efficient. In addition, several new 5G use cases require such delay control, among these, so-called, ultra-reliable multi-point transmission for machine type communication where diversity gains are to be obtained by simultaneous transmission of the same data from multiple transmission nodes. Put otherwise, unless the data transmission is efficient end-to-end, parts of the advantages with the new 5G wireless interfaces may be lost in other parts of the signal chain.

In a massive multi-point transmission system, where data is arriving from uplink core network nodes, each involved transmit point needs to be given access to (portions of) this data, for transmission over the wireless interface. In many applications the data is closely related to data simultaneously being transmitted from other transmit points. This is e.g. the case for streaming video, in which case the data for a specific part of the video are needed at the same time (to within a certain pre-determined margin) in the receiving UE.

It should here be noted that the different transmit points may transmit different data, or the same data for diversity gain, or a mix of these alternatives.

One problem that may arise relates to synchronization of the received data in the UE. Data received by the splitter, i.e. the node that splits the transmission, in the best case will be an ordered set of packets that need to be transmitted to the UE. However, due to non-uniform and very varying delays in the individual flows, the packets received by the UE will in general be out of order. The delay variations that cause the out-of-ordering may be the result of:

Varying queuing delays in the eNBs,
Varying transport network delays, e.g. due to congestion and the technology used for the physical transport, and/or
Varying radio link quality, causing eNB buffer size variation.

It is stressed that the radio link variations and hence the delay variations are likely to increase in importance for higher 5G carrier frequencies, due to the increasing radio shadowing.

Small timing errors between packets received are automatically handled by the protocols applied which re-orders the packets to re-synchronize and create the correct data sequence. However, if the asynchronism is too large, the protocols will register an error, and request re-transmission of several packets. In some protocol implementations, this may cause re-transmission of out of sequence packets already received, as well as packets still in flight. This will then affect the user experience in a negative way, causing e.g. the streaming video to display erroneously.

Another problem is the difficulty of achieving a reliable time synchronization between the nodes involved in a multi-point transmission making prior art solutions, that rely on a reliable time synchronization in order to assure that the packets arrive in the end device essentially in sequence, less useful.

A prior art solution concerning delay when providing multi-point transmission that does not require time synchronization between the nodes is previously known from WO2013/167647 A1. The method in WO2013/167647 A1 calculates and provides a target buffer delay value to intermediate nodes where the target buffer delay value is determined essentially by multiplying a measured Round Trip Time (RTT) value between a control node and the intermediate nodes with a predetermined value. This provides a very rough estimate of the target buffer delay value potentially causing imprecise flow control.

SUMMARY

It is an object to provide multi-point transmission with improved synchronization properties.

This and other objects are met by embodiments of the proposed technology.

According to a first aspect, there is provided a method for controlling multi-point data transmission between a primary node and a User Equipment, UE, via secondary nodes. The method comprises the steps of obtaining Round-Trip Time, RTT, values between a primary node and two or more secondary nodes. The method further comprises determining a time value relationship between uplink and downlink for each of the obtained RTT values; determining a first queue dwell time in a first secondary node of the two or more secondary nodes; and determining a second queue dwell time in a second secondary node of the two or more secondary nodes, the second queue dwell time being determined at least partly based on the RTT values, the time value relationship and the determined first queue dwell time. The method further comprises initiating control of the first and second queue dwell times for synchronized data arrival in the UE.

According to a second aspect, there is provided a network node in a multi-point transmission network configured to control multi-point transmission between a primary node and a User Equipment, UE, via secondary nodes. The network node being configured to obtain Round-Trip Time, RTT, values between a primary node and two or more secondary nodes. The network node is further configured to determine a time value relationship between uplink and downlink for each of the obtained RTT values; determine a first queue dwell time in a first secondary node of the two or more secondary nodes; and determine a second queue dwell time in a second secondary node of the two or more secondary nodes, the second queue dwell time being determined at least partly based on the RTT information, the time value relationship and the determined first queue dwell time. The network node is further configured to initiate control of the first and second queue dwell times for synchronized data arrival in the UE.

According to a third aspect, there is provided a computer program comprising instructions, which when executed by at least one computer, cause the at least one computer to obtain Round-Trip Time, RTT, values between a primary node and two or more secondary nodes, to determine a time value relationship between uplink and downlink for each of the obtained RTT values; to determine a first queue dwell time in a first secondary node of the two or more secondary nodes; to determine a second queue dwell time in a second secondary node of the two or more secondary nodes, the second queue dwell time being determined at least partly based on the RTT information, the time value relationship and the determined first queue dwell time and to initiate control of the first and second queue dwell times for synchronized data arrival in the UE.

According to a fourth aspect, there is provided a computer program product comprising a computer readable medium having stored thereon a computer program according to the third aspect.

According to a fifth aspect, there is provided a carrier comprising the computer program of the third aspect.

According to a sixth aspect, there is provided a method implemented in a communication system including a host computer, a primary node, two or more secondary nodes and a user equipment, UE. The method comprises at the host computer, providing user data and initiating a transmission carrying the user data to the UE via the secondary nodes and wherein the primary node obtains Round-Trip Time, RTT, values between the primary node and the secondary nodes; determines a time value relationship between uplink and downlink for each of the obtained RTT values; determines a first queue dwell time in a first secondary node of the two or more secondary nodes; and determines a second queue dwell time in a second secondary node of the two or more secondary nodes, the second queue dwell time being determined at least partly based on the RTT information, the time value relationship and the determined first queue dwell time. The primary node further controls the first and second queue dwell times for synchronized data arrival in the UE.

According to a seventh aspect, there is provided a communication system including a host computer comprising processing circuitry configured to provide user data; and a communication interface configured to forward the user data to a cellular network for transmission to a user equipment, UE. The cellular network comprises a primary node having a radio interface and processing circuitry. The primary node's processing circuitry is configured to obtain Round-Trip Time, RTT, values between a primary node and two or more secondary nodes; determine a time value relationship between uplink and downlink for each of the obtained RTT values; determine a first queue dwell time in a first secondary node of the two or more secondary nodes; determine a second queue dwell time in a second secondary node of the two or more secondary nodes, the second queue dwell time being determined at least partly based on the RTT information, the time value relationship and the determined first queue dwell time; and initiate control of the first and second queue dwell times for synchronized data arrival in the UE.

An advantage of the proposed technology is that it provides reliable multipoint flow control even in situations when there is no reliable time synchronization between the involved nodes. This flow control allows for enhanced capacity, as a result of the enabled multi-point transmission, by the split bearer time skew control algorithm. Another advantage of the proposed technology is low computational complexity, due to the fact that single-input-single-output controllers may be used for the time-skew control. The proposed technology provides a multi-point transmission with improved synchronization properties in that the delay characteristics between the various flows are improved. Compared to the above mentioned prior art document WO2013167647, the proposed technology accomplishes the same delay from the primary node to each of the secondary nodes. The aim of the control is thus not to accomplish the same RTT value but the same downlink delay which is of major importance when aiming for synchronized data arrival in the UE.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief overview of a multi-transmission system and multipoint flow control basics.

Figure 1:
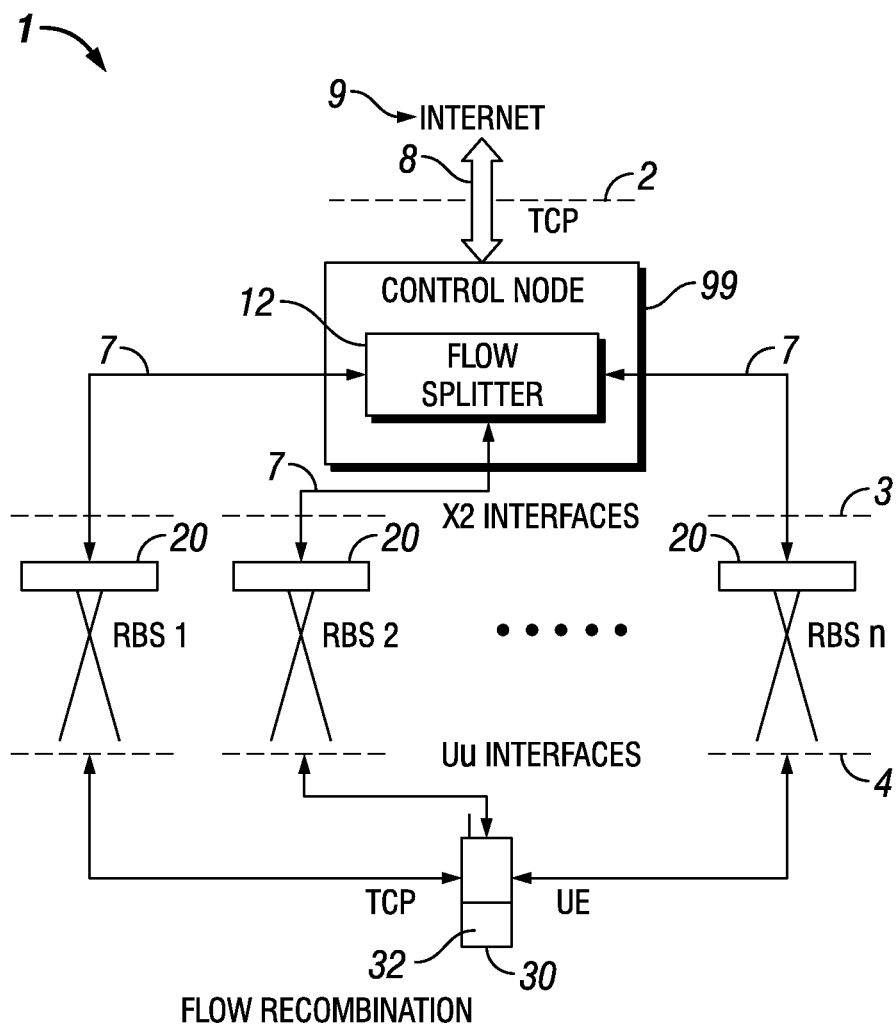
FIG. 1 is an illustration of an exemplary multipoint flow control architecture.

One mechanism for achieving multi-point transmission in prior art is illustrated in FIG. 1, comprising splitting and recombination of a single flow via multiple flows at the physical layer. That figure depicts an architecture of the existing prior art 4G LTE system. Similar architectures in 5G could involve nodes from both the radio access network (RAN) and the core network (CN).

As an example, data 8 from the Internet 9 is received over a Transmission Control Protocol (TCP) interface 2 by a flow splitter 12 of a Control Node 99, which may be an eNodeB here seen as a Master eNodeB (MeNB). This data 8 will in the best case be an ordered set of packets that need to be transmitted to a UE 30. The data 8 is split by the flow splitter 12 into a number of individual flows 7 of packets, provided to a multitude of transmit nodes or wireless-transmission points 20, typically Radio Base Stations (RBS), e.g. eNodeBs here seen as Slave eNodeBs (SeNBs), over an X2 Interface 3. The RBSs 20 transmit the packets by radio signals over Uu interfaces 4 to the UE 30.

In the UE 30, a recombiner 32 performs a flow recombination. However, due to non-uniform and varying delays in the individual flows 7, the packets received by the UE 30 will in general be out of order. The delay variations that cause the out-of-ordering may be the result of:

Varying queuing delays in the RBS,
Varying transport network delays, e.g. due to congestion, and/or
Varying radio link quality, causing RBS buffer size variation.

A first task of a packet scheduler of the flow splitter 12 is to determine the number of packets from the packet queue of the data 8 that are to be sent on at the present time, at each output of the flow splitter 12. In other words, in the packet scheduler, packets to be sent to each of a plurality of transmit nodes 20 in a subsequent sampling period are scheduled. Here, so-called rate shaping may be used, meaning that the packets are sent over a specified time interval with a selected bit rate or packet rate. A motivation for this is provided by information theory, where Shannon's famous result proves that every channel is associated with a maximum rate that allows error free data transfer.

The packet scheduler may also decide, or use external decisions, on the priority path of certain types or classes of packets. It may e.g. always schedule high priority packets via the packet path with the lowest latency to the end user. The packet scheduler may also decide, or use decisions, on diversity transmission, thereby duplicating a packet and scheduling multiple packet copies over several different flows 7. This of course increases the chances of error free reception of the information of said duplicated package, at the receiving end. Diversity transmission could also be achieved over one path, by scheduling copies of the same packets over the same path, but at different times. The chances of good channel conditions for at least one copy of said duplicated packet thereby increases, which in turn increases the probability of correct reception of the information of the duplicated package at the receiving end.

It is stressed that it is the package scheduler of the flow splitter 12 that is responsible for the transmission of packets from the, possibly virtual, node where it resides, in this particular example the Control Node 99.

Figure 2:
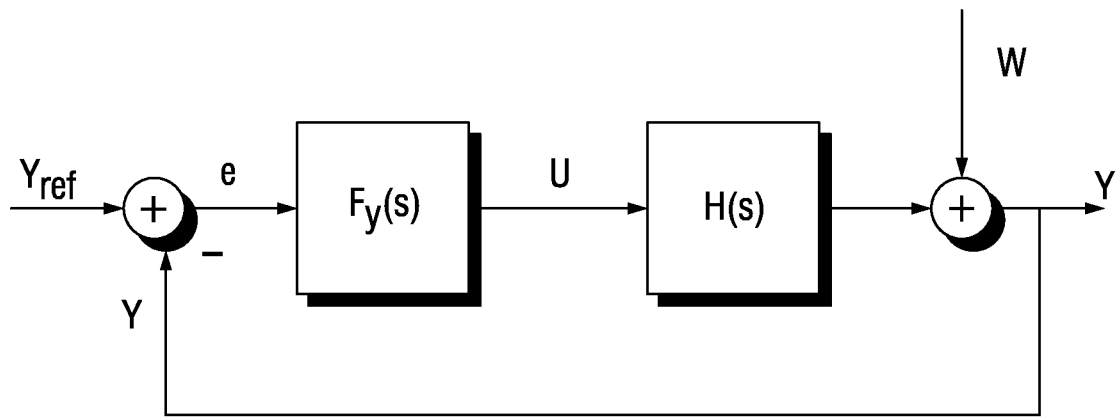
FIG. 2 illustrates a concept of feedback.

The basics of the automatic control terminology used in the present disclosure are explained in Appendix A and with reference to FIG. 2. It is stressed that this terminology is part of the prior art in the field of automatic control.

Figure 3:
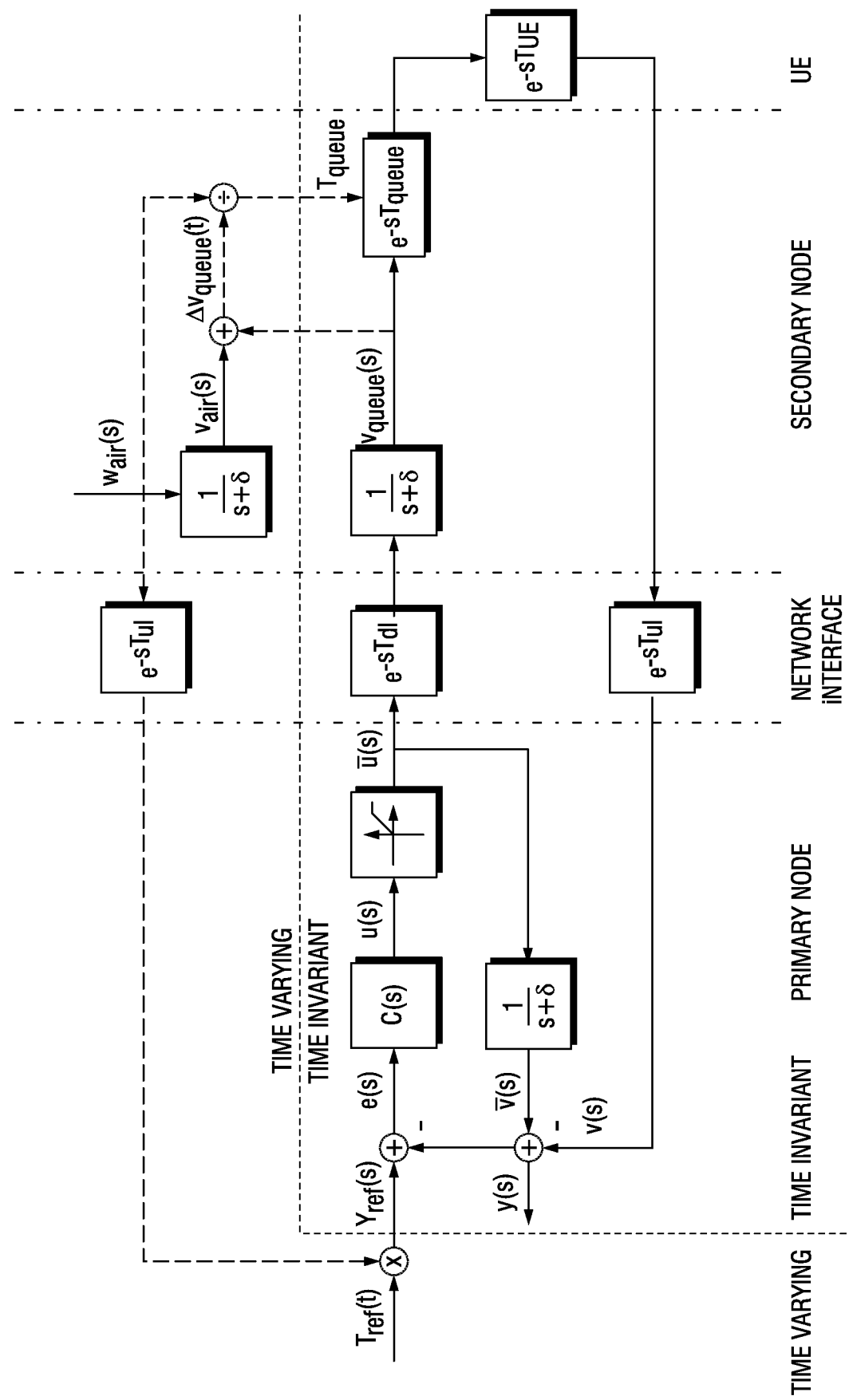
FIG. 3 is a block diagram describing flow control from a primary node over a secondary node.

In order to further clarify the present invention it may be useful to describe the point to point flow control algorithm of FIG. 3 that forms a baseline for the present invention. The algorithm controls the round-trip travel time of packets from a primary node, over a downlink network interface to a secondary wireless transmitting node, over a downlink wireless interface to the UE. In the UE, ACK/NACKS may be formed and sent back to the secondary node, over an uplink wireless interface, where they are forwarded to the primary node, over an uplink backhaul interface. The algorithm is further described in T. Wigren and R. Karaki, "Globally stable wireless data flow control", to appear in IEEE Trans. Contr. Network Systems, vol. 5, no. 1, 2017. DOI: 10.1109/TCNS.2016.2619906, where it is shown to be globally stable for delays and proportional controller gains. The algorithm is computationally simple, with the controller gain being reduced to a constant.

The following explains the variables of FIG. 3, where an independent variable t indicates time domain and s indicates frequency domain:

$T_{ref}(t)$ is the setpoint for the round trip time of data/ACK/NACKs around the loop.

$w_{air}(t)$ is the air interface rate.

$y_{ref}(s)$ is the setpoint for the number of data items (bits) around the loop.

e(s) is the control error.

C(s)=C is the constant controller gain.

u(s) is the control signal, here the data rate.

$e^{-sT_{dl}}$ represents the downlink network delay.

$(s+\delta)^{-1}$ represents a step up of a first quantity related to the data volume in the loop.

$v_{queue}(s)$ represents a first quantity related to the data volume in the loop.

$e^{-sT_{queue}}$ represents the dwell time of the queue.

$e^{-sT_{UE}}$ represents the wireless interface delays plus the UE delay.

$e^{-sT_{ul}}$ represents the uplink backhaul delay.

v(s) represents a second quantity related to the data volume in the loop.

$\bar{v}(s)$ represents a third quantity related to the data volume in the loop.

y(s) represents the data volume in the loop. The corresponding round trip time can e.g. be computed as $$T(t)=y(t)/w_{air}(t)$$

Which is the controlled quantity.

The new decentralized controller structure is here below described for the case with n transmit points, and for one bearer. The generalization to more than 1 bearer is trivial since this generalization is obtained by setting up another instance of the functionality described below. In this context, a bearer may be thought of as supporting a flow of data packets belonging to an IP connection.

Figure 4:
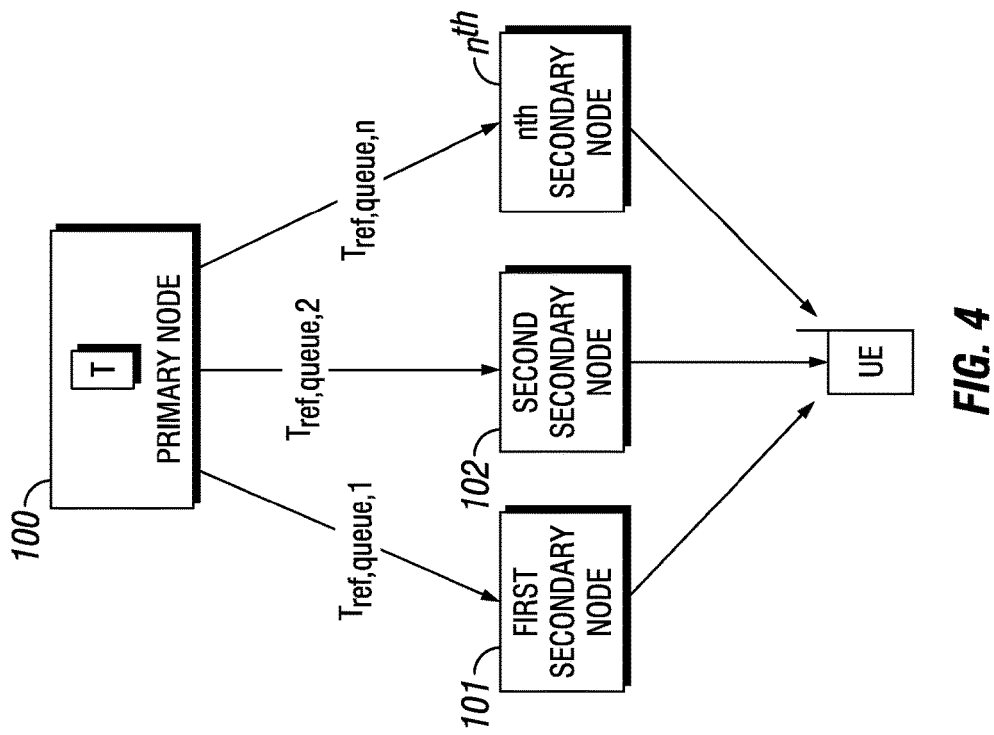
FIG. 4 is a block diagram of an embodiment of a wireless communication system utilizing multi-point transmission.

FIG. 4 illustrates schematically a multi-point transmission system having a primary node, also referred to as a master node, and a number n of secondary nodes, also referred to as slave nodes. A network node, such as the primary node, is configured to obtain RTT values $T_{RTT,backhaul,i}$, i=1, ..., n, between the primary node and the respective secondary nodes. The network node is configured to determine a time value relationship $\alpha_i = T_{dl,i,fix}/T_{RTT,backhaul,i}$, $0 \le \alpha_i \le 1$ between uplink and downlink for the obtained RTT values $T_{RTT,backhaul,i}$. The network node is further configured to determine a first queue dwell time $T_{ref,queue,1}$ in a first secondary node, and to determine a second queue dwell time $T_{ref,queue,2}$ in a second secondary node. The second queue dwell time $T_{ref,queue,2}$ is determined at least partly based on the RTT value $T_{RTT,backhaul,2}$, between the primary and the second secondary node, the time value relationship $\alpha_i$ and the determined first queue dwell time $T_{ref,queue,1}$. The network node is then configured to initiate control of the first and second queue dwell times for synchronized data arrival in the UE. The network node may be configured to initiate transmission of the queue dwell times from the primary node to the respective secondary nodes.

Figure 5:
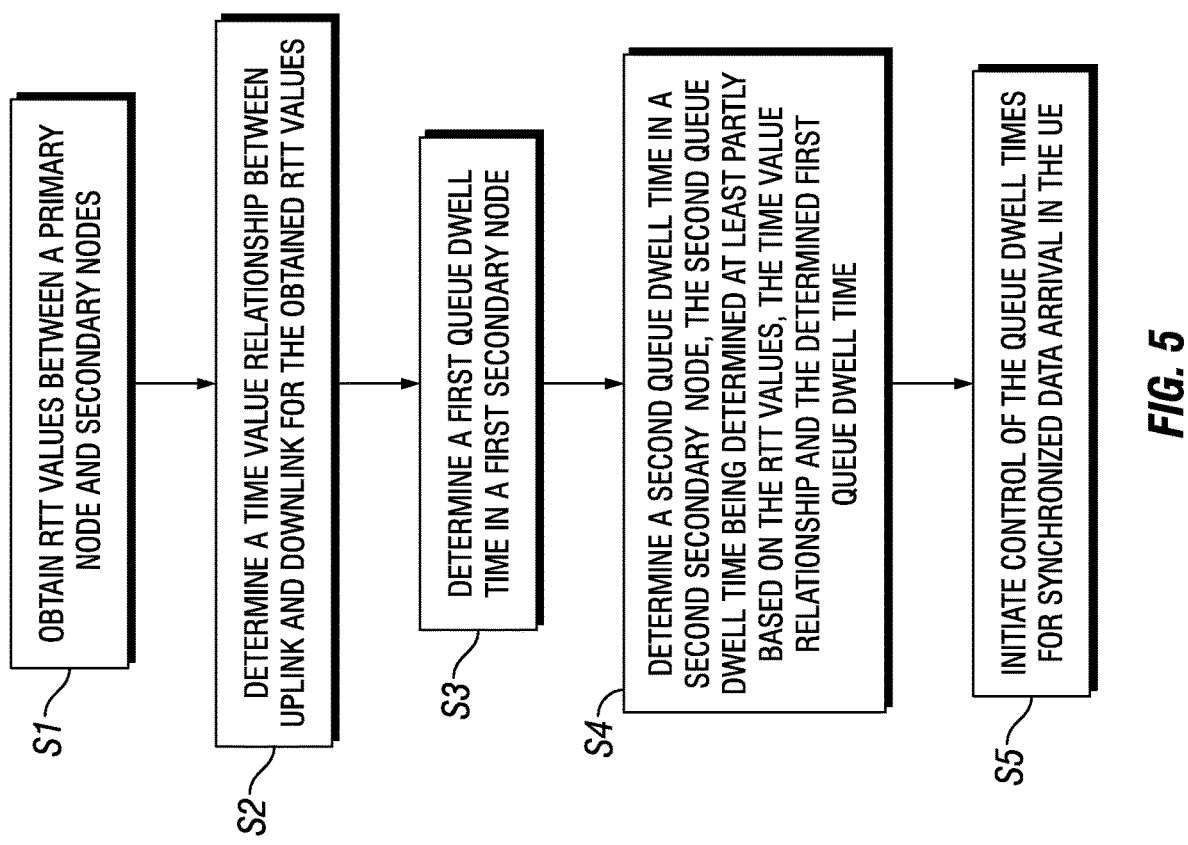
FIGS. 5-7 are flow diagrams of steps of embodiments of methods associated with multi-point transmission control.

FIG. 5 is a flow diagram of steps of an embodiment for multi-point transmission control implemented in a network node.

RTT measurement signals may, at essentially the same time instance, be transmitted from the primary node to the first and the second secondary nodes. Preferably, the RTT measurement signals are transmitted at periodic intervals. In step S1, RTT values $T^{RTT,backhaul,i}$, i=1, ..., n, or information representing RTT values, between the primary node and the respective secondary nodes are obtained. Assuming that the time base between the primary and secondary nodes differ by $\Delta_i$, i=1,2 where i denotes the leg such that leg 1 is between the primary and a first secondary node, 2 is between the primary and a second secondary node, etc. It is then assumed that the downlink transmission is time stamped in the primary node at time $t_{1,i}$ and that the ACK/NACK is time stamped in the secondary node at time $t_{2,i}+\Delta_i$. These time stamped data items are then received at time $t_{1,i}+T_{dl,i}+\Delta_i$ in the secondary node, and at time $t_{2,i}+T_{ul,i}$ in the primary node. This gives the measured total round trip travel time over the backhaul links as $T_{RTT,backhaul,i}=(t_{1,i}+T_{dl,i}+\Delta_i-t_{1,i})+(t_{2,i}+T_{ul,i}-(t_{2,i}+\Delta_i))=T_{dl,i}+T_{ul,i}$. Hence the synchronization error in the downlink is canceled by the one in the uplink. According to an embodiment of the invention, the minimum value over a plurality of $T_{RTT,backhaul,i}$ measurements is used as the determined values, thereby avoiding occasional larger values that could e.g. have been caused by congestion.

In step S2, a distribution of $T_{RTT,backhaul,i}$ between the downlink and the uplink, i.e. a time value relationship between uplink and downlink for the obtained RTT values, is determined. In an embodiment of the invention the time value relationship is determined individually for each obtained RTT value, such as $T_{dl,i,fix}=\alpha_i T_{RTT,backhaul,i}$ and $T_{ul,i,fix}=(1-\alpha_i)T_{RTT,backhaul,i}$, $0 \le \alpha_i \le 1$. In an alternative embodiment the time value relationship is set to a value that is the same for all obtained RTT values, meaning that all legs have the same time value relationship.

By setting a fixed time value relationship makes it possible to apply the invention to situations when there is no reliable time synchronization between the nodes. The time value relationship may, as an example, be set manually during deployment of the system, and may further be modified by using some other system for synchronization at intermittent intervals and/or when such other synchronization possibilities are present. For example, some nodes may have Global Navigation Satellite System (GNSS) time, for example for positioning purposes, which could be used for recalibrating time value relationship at regular or irregular intervals. However, the time value relationship is intended to be fixed for at least a plurality of loops and preferably for longer periods, such as days and weeks.

Instead of determining a fixed distribution of the total backhaul delay between the uplink and the downlink an alternative would be to determine the time value relationship in dependence of the network load. This can for example be performed as follows. First, a backhaul round trip time is determined at a time when the load on the network is low such that the measurement signals are subject to a minimal delay. As a result of these measurements a certain fraction is distributed to the uplink and a certain fraction to the downlink, e.g. 0.5, 0.4 or 0.6. Then, at a later time when the network is subject to a higher load and thus a higher signaling delay, a new backhaul round trip time is determined. Since the downlink is more often congested, a larger portion of the round trip time will be assigned to the downlink. In fact, in many situations the uplink delay will be unaffected by the load on the network resulting in time value relationship being proportional to the delay in round trip time.

In step S3, a first queue dwell time $T_{ref,queue,1}$ is determined in a first secondary node. In accordance with an embodiment of the invention the determination starts by selecting a value of a reference downlink delay as $T_{ref,dl,1}=T_{ref,queue,1}+T_{dl,1,fix}$.

As a generalization, this downlink delay reference value $T_{ref,dl,1}$ could be modified over time and its value may also be obtained from some other process. A downlink delay reference value $T_{ref,dl,1}$ may be determined based on measured or expected backhaul delays. Expected backhaul delays may be determined depending on how the backhaul is physically implemented, if it's e.g. over fiber, radio or copper. It's important to be able to react before the queues in the secondary nodes run empty, i.e. a queue shouldn't run empty before the control signals have reached the secondary nodes. If that happens, the different secondary nodes will not receive the control signals in form of the queue dwell times before data intended for the UE arrives, which in turn may lead to unsynchronized data arrival in the UE. Therefore, the downlink delay reference value $T_{ref,dl,1}$ should be large enough for the queue dwell times $T_{ref,queue,i}$ to be larger than, or at least equal to, $T_{UE}+T_{RTT,backhaul,i}$. This results in that $$T_{ref,dl,1}=T_{ref,queue,1}+T_{dl,1,fix}+T_{UE} \ge 2T_{dl,1,fix}+T_{ul,1}+T_{UE}=T_{RTT,backhaul,1}+T_{dl,1,fix}+T_{UE}$$

The downlink delay reference value $T_{ref,dl,1}$ should thus be at least equal to or larger than the sum of the RTT value and the fixed downlink delay and the delay on the UE side.

To achieve this downlink delay reference value, the reference round trip delay value for the first leg then needs to meet $$T_{ref,1} = T_{ref,dl,1} + T_{UE} + T_{ul,1,fix} = T_{ref,queue,1} + T_{UE} + T_{RTT,backhaul,1}.$$

Therefore, it is equally possible to directly select the value of the setpoint for the queue dwell time $T_{ref,queue,1} = T_{ref,dl,1} - T_{dl,1}$. The first leg may then be controlled using the algorithm of FIG. 3 based on the reference round trip delay value $T_{ref,1}$ which is reliant on the queue dwell time $T_{ref,queue,1}$.

In step S4, a second queue dwell time $T_{ref,queue,2}$ is determined for a second secondary node. In order to make this determination the setpoint of the second leg is set to be equal to $T_{ref,dl,1}$, i.e. $T_{ref,dl,1} = T_{ref,queue,2} + T_{dl,2,fix}$ in order to target the data transmitted from the primary node to arrive in the UE at the same time. This results in $T_{ref,queue,2} = T_{ref,dl,1} - T_{dl,2,fix} = T_{ref,dl,1} - \alpha_2 T_{RTT,backhaul,2}$, wherein the second queue dwell time is determined, at least partly, by using the obtained RTT information, the time value relationship for the second leg and the determined first queue dwell time. As can be seen, the second queue dwell time of the second leg becomes slaved to the first leg.

The second queue dwell time can also be expressed as $T_{ref,queue,2} = T_{ref,dl,1} - T_{dl,2,fix} = T_{ref,queue,1} + T_{dl,1,fix} - T_{dl,2,fix}$ which in turn results in a downlink delay reference value for the second leg as:

$$\begin{aligned} T_{ref,2} &= T_{ref,queue,2} + T_{dl,2,fix} + T_{UE} + T_{ul,2,fix} \\ &= T_{ref,dl,1} + T_{UE} + T_{ul,2,fix} = \\ & T_{ref,1} - T_{UE} - T_{ul,1,fix} + T_{UE} + T_{ul,2,fix} \\ &= T_{ref,1} - (T_{ul,2,fix} - T_{ul,1,fix}) \end{aligned}$$

In a time-varying setting, the following would be obtained:

$$T_{ref,2}(t) = T_{ref,1}(t) - (T_{ul,2,fix} - T_{ul,1,fix}).$$

As can be seen, the downlink delay reference value of the second leg becomes slaved to the first leg.

In step S5, control of the first and second queue dwell times is initiated in order to achieve synchronized data arrival in the UE. The first and second legs may then be controlled with the controller of FIG. 3, using reference round trip delay values $T_{ref,1}$ and $T_{ref,2}$ which are dependent on the queue dwell times $T_{ref,queue,1}$ and $T_{ref,queue,2}$.

Notably, the method described above, and with reference to FIG. 5, results in an improved multi-point transmission flow control, suitable for 5G dual connectivity, by providing a globally stable downlink delay control without requiring time synchronization between nodes.

Note that the present invention controls the transmission time difference from multiple transmission points such as base stations. The controlling is performed by a controller in a network node, such as a primary node in which the transmission is split and continued towards the UE via multiple secondary nodes, such as base stations. However, the controlling may also be performed in a network node separate from the primary node where the split takes place. In such an embodiment the primary node may merely provide measurement values, such as time stamps to the network node where the queue dwell time values are determined and returned to the primary node for control of the queue dwell times in the secondary nodes. From the perspective of the transmission nodes the controlling network node may be physically located closer to the data source in the network architecture, but it may also be physically co-located with one of the secondary nodes. The control loop generally operates at the packet data convergence protocol (PDCP) layer, above base band layers, and it operates on user data streams. The present invention operates on data packets for a packet switched network and is not frame based, hence time skew control is independent of any frame structure. Since the split generally takes place in the PDCP layer, the primary node can be seen as the logical node that comprises the PDCP layer, and the secondary nodes comprises the radio link control (RLC) and the medium access control (MAC) layers. Thus, irrespective of physical location, a primary node should be seen as a node logically separate from the secondary nodes even though a primary node may be physically co-located with a secondary node. In case of the primary node being physically co-located with a secondary node, the signaling between the primary node and the co-located secondary node may be different than between the primary node and the other secondary nodes, for example a direct internal signaling compared to a signaling over an X2 interface. In the present disclosure, "signaling" refers to control signaling as well as data traffic. In for example a dual connectivity setting, the primary node corresponds to a Master eNodeB (MeNB), the secondary node corresponds to a Serving eNodeB (SeNB) and the network interface corresponds to an interface between the MeNB and the SeNB.

The present technology aims at equalizing the time skew differences caused by the backhaul delay variations and the delay variation associated with the dynamically varying data contents of the transmission buffers of the secondary nodes, which in turn are affected by the wireless capacity variations.

The present technology discloses time skew transmission time control for a packet switched network, such as 4G LTE and 5G. In such systems the amount of user data allocated to a user for transmission over the air interface is not determined beforehand, instead it varies with the channel and the transmission of data of other users. Since air interface utilization requires data to be available for transmission at any time, this means that transmission buffers are needed for packet switched systems to maximize utilization when users are scheduled. The present technology provides a way to control the time the packets shall be delayed in the transmission buffers of the secondary nodes, i.e. the dwell time.

The control loop of the present technology only includes the primary node and the secondary nodes and is thus terminated at the transmission node side of the air interface, no extra messages are sent to the UE which is thus outside the control loop of the technology.

The above described steps of the method are performed regularly for example at constant intervals. In particular, the step of obtaining of RTT values in the controlling network node is, in preferred embodiments, performed at periodic intervals and at essentially the same time instance for each leg, i.e. for each RTT value obtained for use in the method. In order to accomplish the control objective, the downlink transmission time values, $T_{dl,1,fix}$, are updated and subsequently the queue dwell times $T_{ref,queue,1}$ for the control loop will be determined and applied at regular intervals. The time instance of a measurement is important for accurate feedback control and it is stressed that it is not the time instances when feedback measurements are sent to other nodes or functions in the network that are of interest, it is when the measurements are performed, such as when the RTT measurement signals (e.g. pings) are transmitted and received. The primary node thus samples RTT values for the paths to/from the first and the second secondary nodes regularly and at essentially the same time instance for all paths, so that the values for the control loops will be accurate. The obtained RTT values used for the control loop may be the last sampled RTT values, but other options are viable, such as an average or a weighted average over a number of samples.

Figure 6:
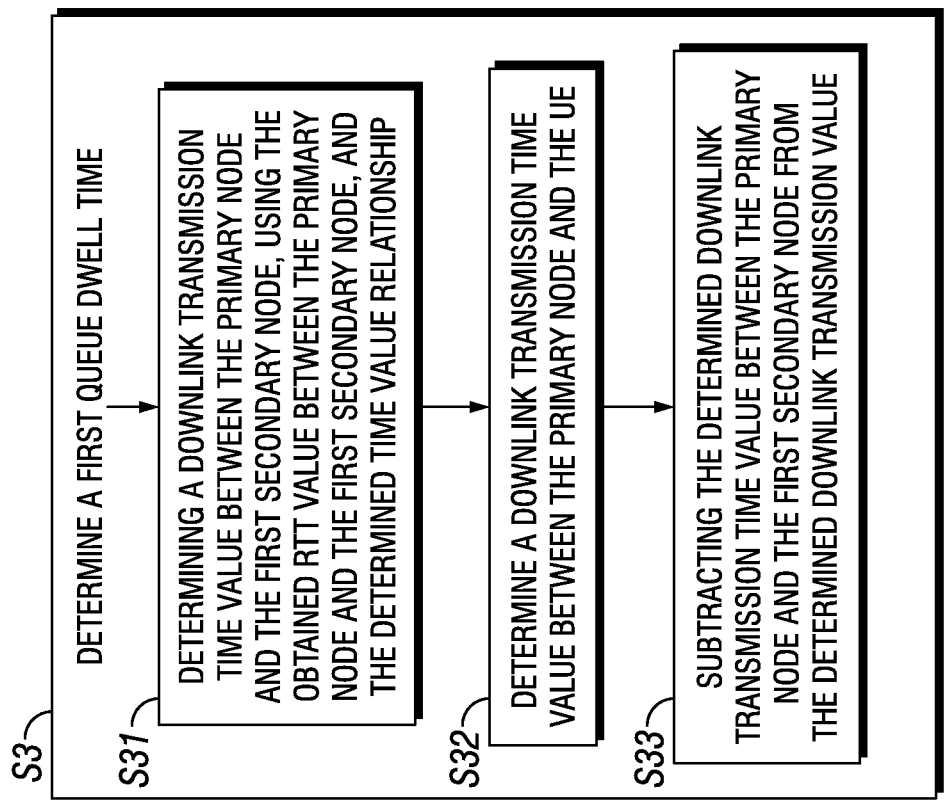

FIG. 6 is a part flow diagram of an embodiment of step S3 of FIG. 5. In step S31 a downlink transmission time value between the primary node and the first secondary node is determined by using the obtained RTT value between the primary node and the first secondary node as well as the determined time value relationship. In step S32, a downlink transmission time value between the primary node and the UE is determined. In step S33, the determined downlink transmission time value between the primary node and the first secondary node is subtracted from the determined downlink transmission value.

Figure 7:
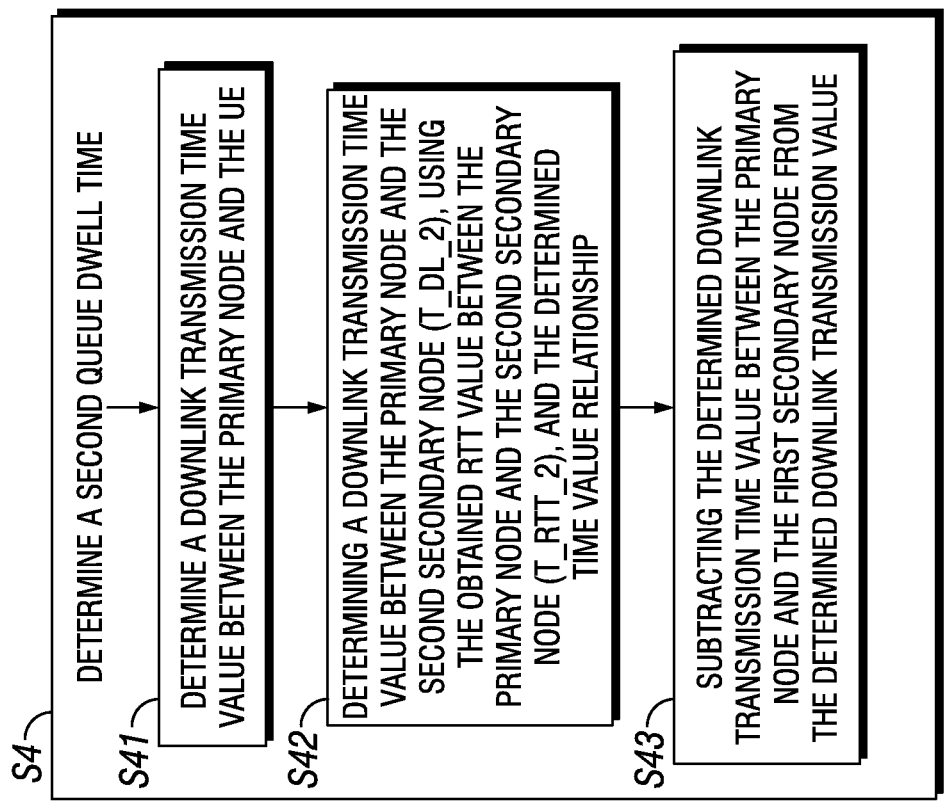

FIG. 7 is a part flow diagram of an embodiment of step S4 of FIG. 5. In step S41 a downlink transmission time value between the primary node and the UE is determined. In step S42, a downlink transmission time value between the primary node and the second secondary node, using the obtained RTT value between the primary node and the second secondary node, and the determined time value relationship is determined. In step S43, the determined downlink transmission time value between the primary node and the first secondary node is subtracted from the determined downlink transmission value.

To describe the proposed technology, it is noted that the secondary nodes are nodes that perform the wireless interface transmission and that get their transmit data from transmit queues, typically one queue for each "bearer", where a bearer may be thought of as an IP connection between the source and the end user. The reason the secondary nodes need queues is that the radio channels are subject to rapid fading. Furthermore, the interface between the secondary nodes and the primary data source node, i.e. the backhaul interface, is subject to delay in both the downlink and the uplink. To ensure that the secondary nodes do not run out of data when there is data to transmit upstream, queues are needed for buffering purposes. The queues are typically designed to give a packet dwell time in the transmit queues of the order of the sum of the UL and DL backhaul delay.

Each queue in a secondary node is controlled by a separate controller, exploiting feedback from the queue data volume and feedforward from the measured air interface rate with the purpose of controlling the dwell time of the queue to follow a desired reference value. The air interface rate can also be referred to as wireless rate, interchangeably.

The proposed technology outlines new techniques to regulate the transmit queue levels of multiple transmit points served by secondary nodes, so that the timing skews between transmit paths experienced in the UE are all within pre-specified limits. In a preferred embodiment the regulation is performed per bearer. In another embodiment aggregates of bearers may be used. In the proposed technology it is assumed that the controller that performs data splitting and time skew control resides in a network node, such as a primary node. The division of functionality between the primary node, and the secondary interface is depicted in FIG. 3.

A special feature of the proposed technology is that it is formulated for an arbitrary number (n) of secondary transmit nodes.

A special feature of the proposed technology is that secondary inter-node coupling is minimized. Instead reference value setting is employed. The effect would be to simplify the controller design and the computational complexity, by design of each single path loop in an independent manner.

As used herein, the non-limiting term "User Equipment (UE)" may be any device that has an addressable interface (e.g., an Internet protocol (IP) address, a Bluetooth identifier (ID), a near-field communication (NFC) ID, etc.) and/or is intended for accessing services via an access network and configured to communicate over the access network via the addressable interface. For instance, the UE may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The UE may be a portable, pocket-storable, hand-held, computer-comprised, or vehicle-mounted mobile device, enabled to communicate voice and/or data, via a wireless or wireline connection. A UE may have functionality for performing monitoring, controlling, measuring, recording, etc., that can be embedded in and/or controlled/monitored by a central processing unit (CPU), microprocessor, ASIC, or the like, and configured for connection to a network such as a local ad-hoc network or the Internet. A UE may have a passive communication interface, such as a quick response (Q) code, a radio-frequency identification (RFID) tag, an NFC tag, or the like, or an active communication interface, such as a modem, a transceiver, a transmitter-receiver, or the like.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs, or evolved Node Bs (eNB) or next generation node Bs (gNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 8:
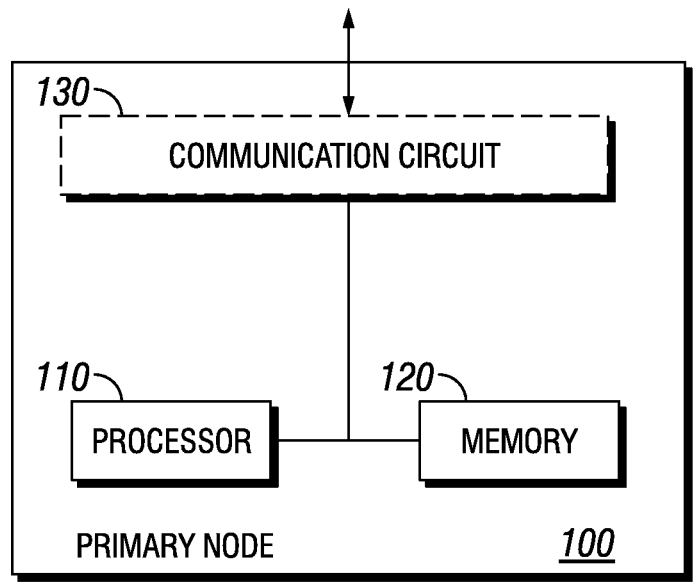
FIGS. 8-13 are illustrations of nodes in a system employing multi-point transmission.

FIG. 8 is a schematic block diagram illustrating an example of a network node 100, such as the primary node, based on a processor-memory implementation according to an embodiment. In this particular example, the primary node 100 comprises a processor 110 and a memory 120, the memory 120 comprising instructions executable by the processor 110, whereby the processor is operative to obtain RTT values between a primary node and secondary nodes; to determine a time value relationship between uplink and downlink for the obtained RTT values; to determine a first queue dwell time in a first secondary node; and to determine a second queue dwell time in a second secondary node, the second queue dwell time being determined at least partly based on the RTT information, the time value relationship and the determined first queue dwell time; and to initiate control of the first and second queue dwell times for synchronized data arrival in the UE.

Optionally, the network node 100 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s).

Figure 9:
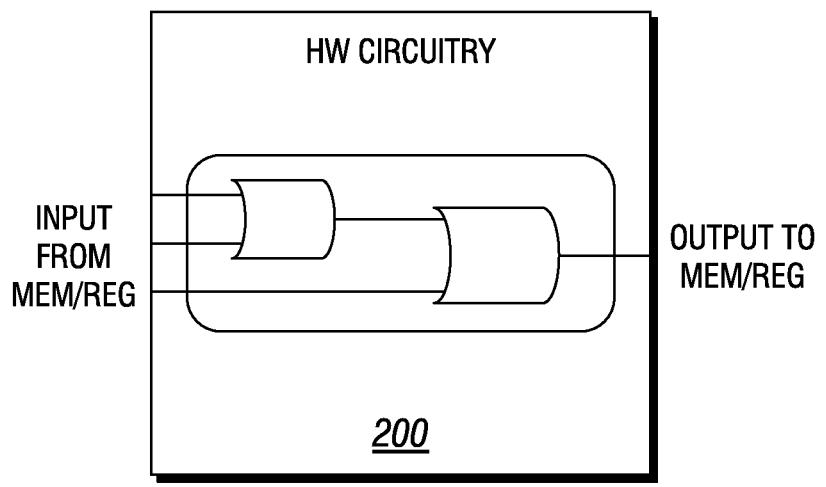

FIG. 9 is a schematic block diagram illustrating another example of a network node 200, such as a primary node, based on a hardware circuitry implementation according to an embodiment. Examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 10:
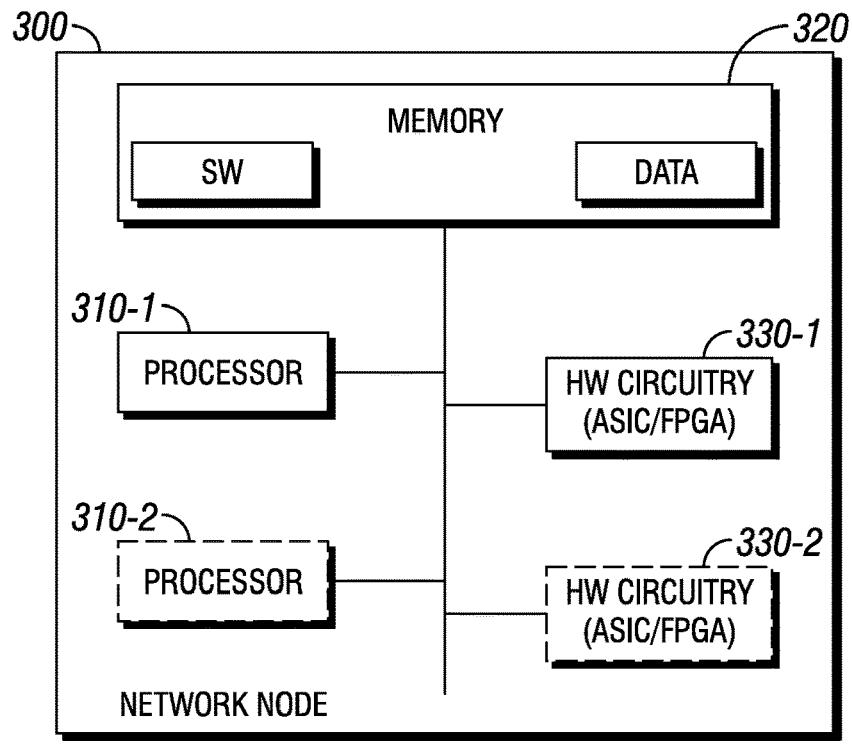

FIG. 10 is a schematic block diagram illustrating yet another example of a network node, such as a primary node 300, based on combination of both processor(s) 310-1, 310-2 and hardware circuitry 330-1, 330-2 in connection with suitable memory unit(s) 320. The primary node 300 comprises one or more processors 310-1, 310-2, memory 320 including storage for software and data, and one or more units of hardware circuitry 330-1, 330-2 such as ASICs and/or FPGAs. The overall functionality is thus partitioned between programmed software (SW) for execution on one or more processors 310-1, 310-2, and one or more pre-configured or possibly reconfigurable hardware circuits 330-1, 330-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 11:
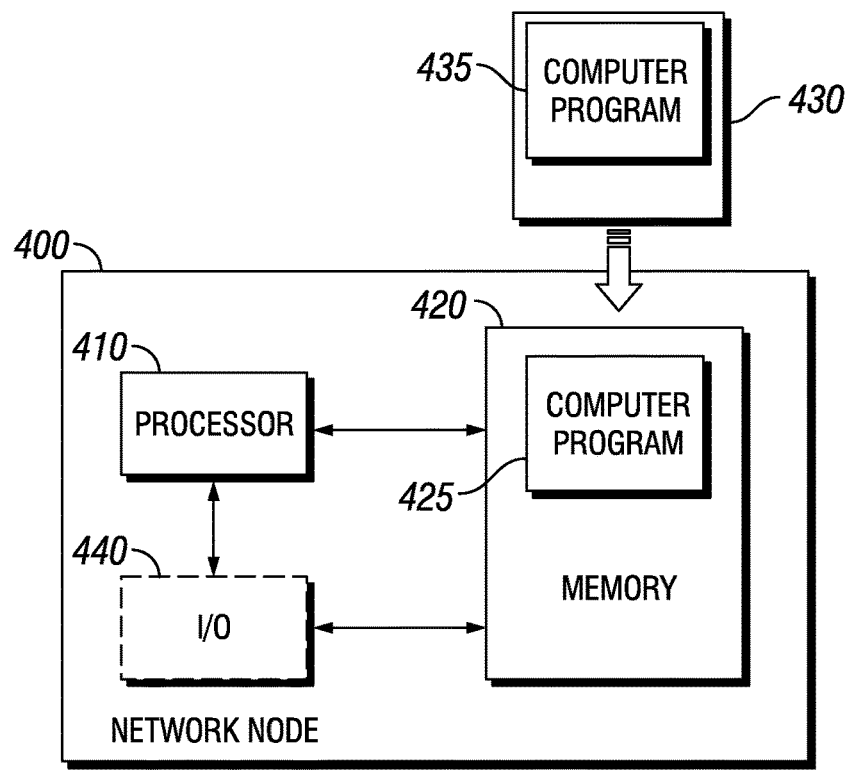

FIG. 11 is a schematic diagram illustrating an example of a computer-implementation of a network node, such as a primary node 400, according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

The processing circuitry including one or more processors 410 is thus configured to perform, when executing the computer program 425, well-defined processing tasks such as those described herein.

In a particular embodiment, the computer program 425; 435 comprises instructions, which when executed by at least one processor 410, cause the processor(s) 410 to obtain RTT values between a primary node and secondary nodes; to determine a time value relationship between uplink and downlink for the obtained RTT values; to determine a first queue dwell time in a first secondary node; and to determine a second queue dwell time in a second secondary node, the second queue dwell time being determined at least partly based on the RTT information, the time value relationship and the determined first queue dwell time; and to initiate control of the first and second queue dwell times for synchronized data arrival in the UE.

The term 'processor' should be interpreted in a general sense as any system or device capable of executing program code or computer program instructions to perform a particular processing, determining or computing task.

The processing circuitry does not have to be dedicated to only execute the above-described steps, functions, procedure and/or blocks, but may also execute other tasks.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 12:
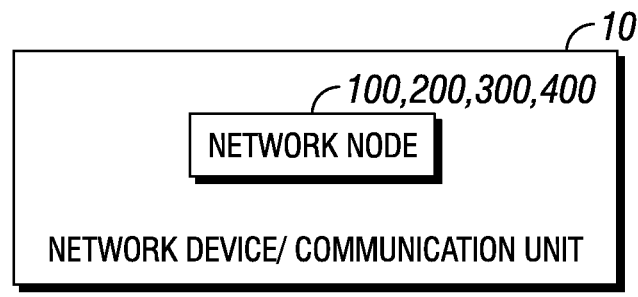

FIG. 12 is a schematic block diagram illustrating an example of a network device 10 comprising a network node 100; 200; 300; 400 according to any of the embodiments above.

According to an aspect, there is provided a network device/communication unit 10 comprising a network node 100; 200; 300; 400 as described herein.

According to another aspect, there is provided a communication unit 10 in a wireless communication system, wherein the communication unit 10 comprises a network node 100; 200; 300; 400 as described herein. The communication unit may be any suitable communication unit in the wireless communication system. By way of example, the communication unit may be a wireless communication device such as a UE, STA or similar end-user device.

The network device 10 may be any suitable network device in the wireless communication system, or a network device in connection with the wireless communication system. By way of example, the network device may be a suitable network node such a base station or an access point. However, the network device may alternatively be a cloud-implemented network device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 13:
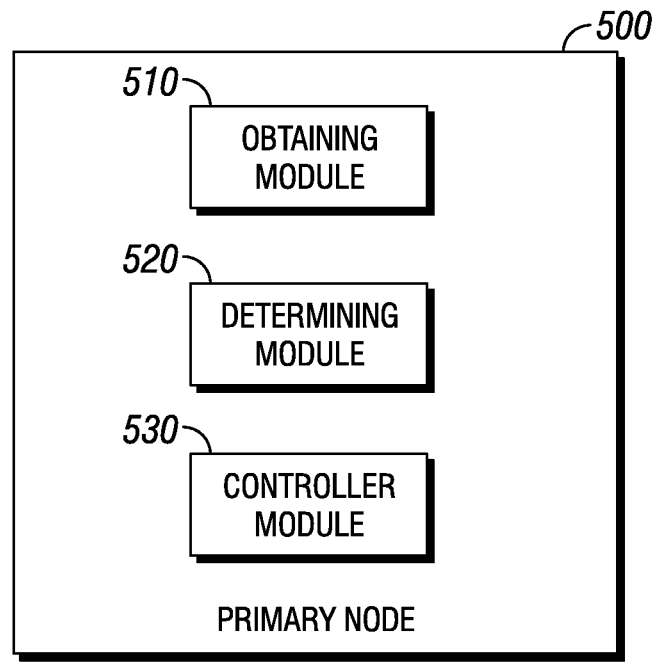

FIG. 13 is a schematic diagram illustrating an example of a network node, such as a primary node 500, for assisting in controlling of multi-point transmission comprises an obtaining module 510 for obtaining RTT values between a primary node and secondary nodes. The network node further comprises a determining module 520 for determining a time value relationship between uplink and downlink for the obtained RTT values; for determining a first queue dwell time in a first secondary node; and for determining a second queue dwell time in a second secondary node, the second queue dwell time being determined at least partly based on the RTT values, the time value relationship and the determined first queue dwell time. The network node further comprises a controller module 530 for initiating control of the first and second queue dwell times for synchronized data arrival in the UE.

Alternatively, it is possible to realize the module(s) in FIG. 13 predominantly by hardware modules, or alternatively by hardware, with suitable interconnections between relevant modules. Examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 14:
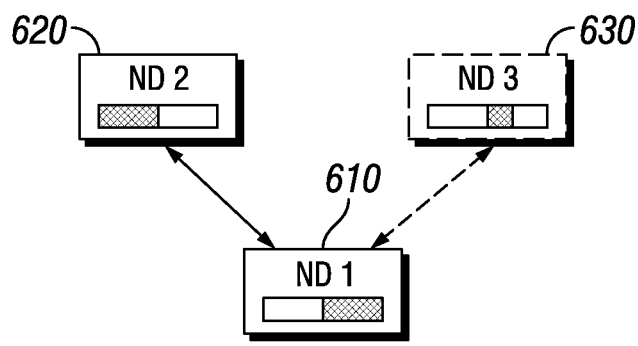
FIG. 14 is a schematic diagram illustrating an example of general functionality distribution or partition.

FIG. 14 is a schematic diagram illustrating an example of how functionality can be distributed or partitioned between different network devices in a general case. In this example, there are at least two individual, but interconnected network devices, ND1 and ND2, with reference numerals 610 and 620, respectively, which may have different functionalities, or parts of the same functionality, partitioned between the network devices 610 and 620. There may be additional network devices, such as ND3, with reference numeral 630, being part of such a distributed implementation. The network devices 610-630 may be part of the same wireless communication system, or one or more of the network devices may be so-called cloud-based network devices located outside of the wireless communication system.

Figure 15:
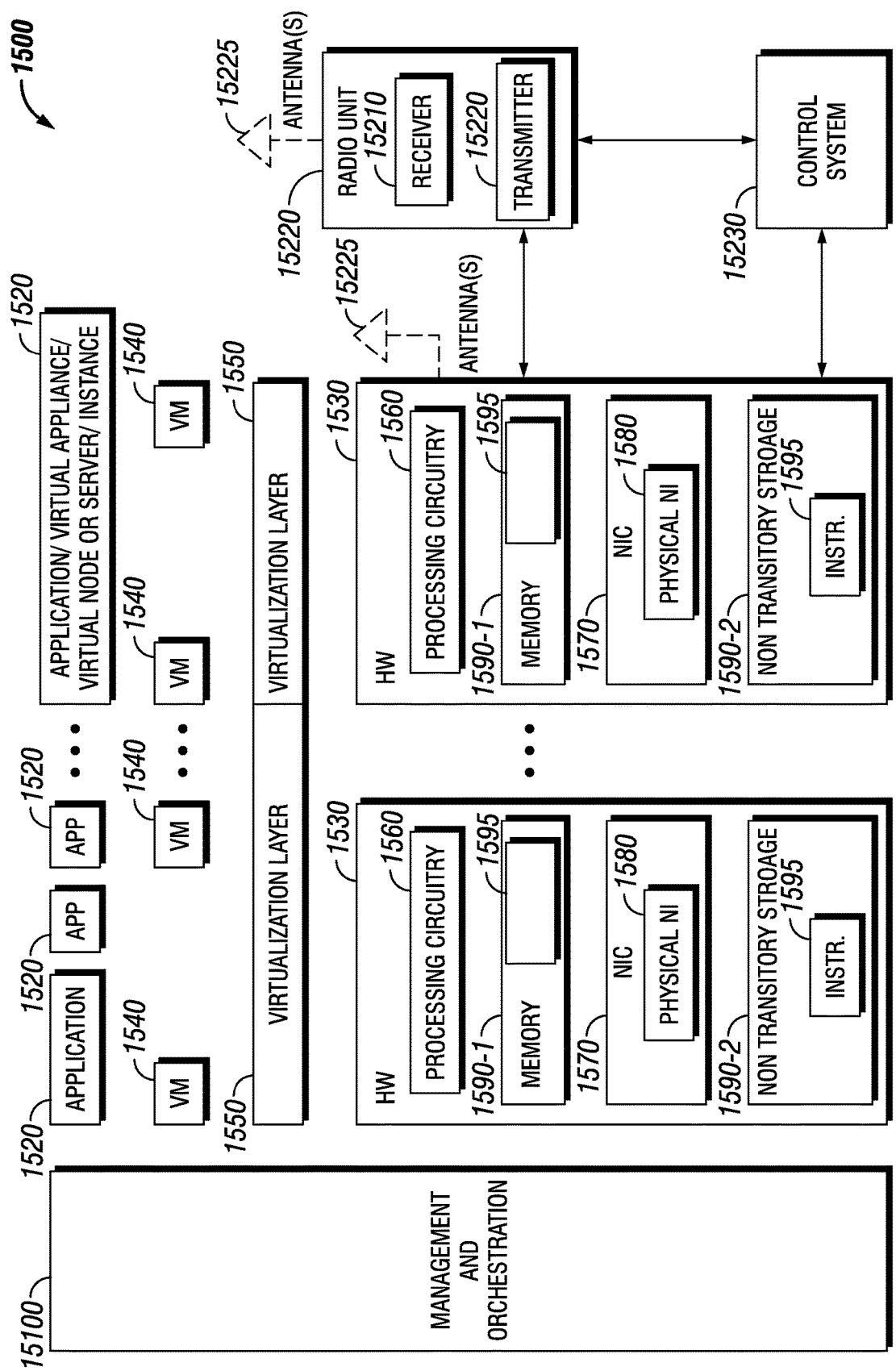
FIG. 15 is a schematic block diagram illustrating an example of a virtualization environment in which functions implemented by some embodiments may be virtualized.

FIG. 15 is a schematic block diagram illustrating an example of a virtualization environment 1500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node may be entirely virtualized.

The functions may be implemented by one or more applications 1520 (which may alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500, comprises general-purpose or special-purpose network hardware devices 1530 comprising a set of one or more processors or processing circuitry 1560, which may be commercial off-the-shelf (COTS) processors, dedicated Application Specific Integrated Circuits (ASICs), or any other type of processing circuitry including digital or analog hardware components or special purpose processors. Each hardware device may comprise memory 1590-1 which may be non-persistent memory for temporarily storing instructions 1595 or software executed by processing circuitry 1560. Each hardware device may comprise one or more network interface controllers (NICs) 1570, also known as network interface cards, which include physical network interface 1580. Each hardware device may also include non-transitory, persistent, machine-readable storage media 1590-2 having stored therein software 1595 and/or instructions executable by processing circuitry 1560. Software 1595 may include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and may be run by a corresponding virtualization layer 1550 or hypervisor. Different embodiments of the instance of virtual appliance 1520 may be implemented on one or more of virtual machines 1540, and the implementations may be made in different ways.

During operation, processing circuitry 1560 executes software 1595 to instantiate the hypervisor or virtualization layer 1550, which may sometimes be referred to as a virtual machine monitor (VMM). Virtualization layer 1550 may present a virtual operating platform that appears like networking hardware to virtual machine 1540.

As shown in FIG. 15, hardware 1530 may be a standalone network node with generic or specific components. Hardware 1530 may comprise antenna 15225 and may implement some functions via virtualization. Alternatively, hardware 1530 may be part of a larger cluster of hardware (e.g. such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1540 may be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 may be coupled to one or more antennas 15225. Radio units 15200 may communicate directly with hardware nodes 1530 via one or more appropriate network interfaces and may be used in combination with the virtual components to provide a virtual node with radio capabilities, such as a radio access node or a base station.

In some embodiments, some signaling can be effected with the use of control system 15230 which may alternatively be used for communication between the hardware nodes 1530 and radio units 15200.

Figure 16:
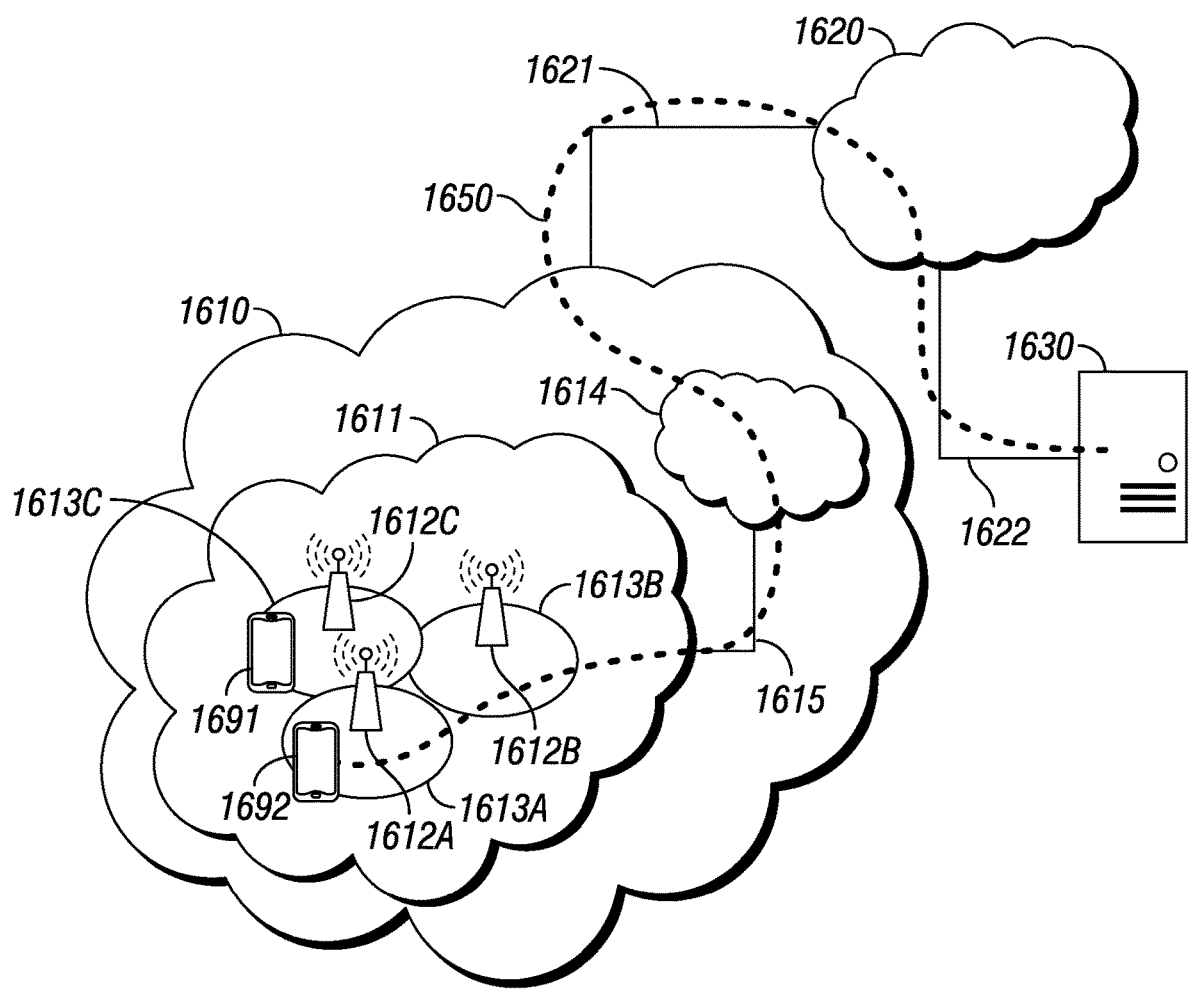
FIG. 16 is a schematic diagram illustrating an example of a telecommunication network connected via an intermediate network to a host computer in accordance with some embodiments.

FIG. 16 is a schematic diagram illustrating an example of a telecommunication network connected via an intermediate network to a host computer in accordance with some embodiments.

With reference to FIG. 16, in accordance with an embodiment, a communication system includes telecommunication network 1610, such as a 3GPP-type cellular network, which comprises access network 1611, such as a radio access network, and core network 1614. Access network 1611 comprises a plurality of base stations 1612a, 1612b, 1612c, such as NBs, eNBs, gNBs or other types of wireless access points, each defining a corresponding coverage area 1613a, 1613b, 1613c. Each base station 1612a, 1612b, 1612c is connectable to core network 1614 over a wired or wireless connection 1615. A first UE 1691 located in coverage area 1613c is configured to wirelessly connect to, or be paged by, the corresponding base station 1612c. A second UE 1692 in coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to the corresponding base station 1612.

Telecommunication network 1610 is itself connected to host computer 1630, which may be embodied in the hardware and/or software of a standalone server, a cloud-implemented server, a distributed server or as processing resources in a server farm. Host computer 1630 may be under the ownership or control of a service provider, or may be operated by the service provider or on behalf of the service provider. Connections 1621 and 1622 between telecommunication network 1610 and host computer 1630 may extend directly from core network 1614 to host computer 1630 or may go via an optional intermediate network 1620. Intermediate network 1620 may be one of, or a combination of more than one of, a public, private or hosted network; intermediate network 1620, if any, may be a backbone network or the Internet; in particular, intermediate network 1620 may comprise two or more sub-networks (not shown).

The communication system of FIG. 16 as a whole enables connectivity between the connected UEs 1691, 1692 and host computer 1630. The connectivity may be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 may be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

Figure 17:
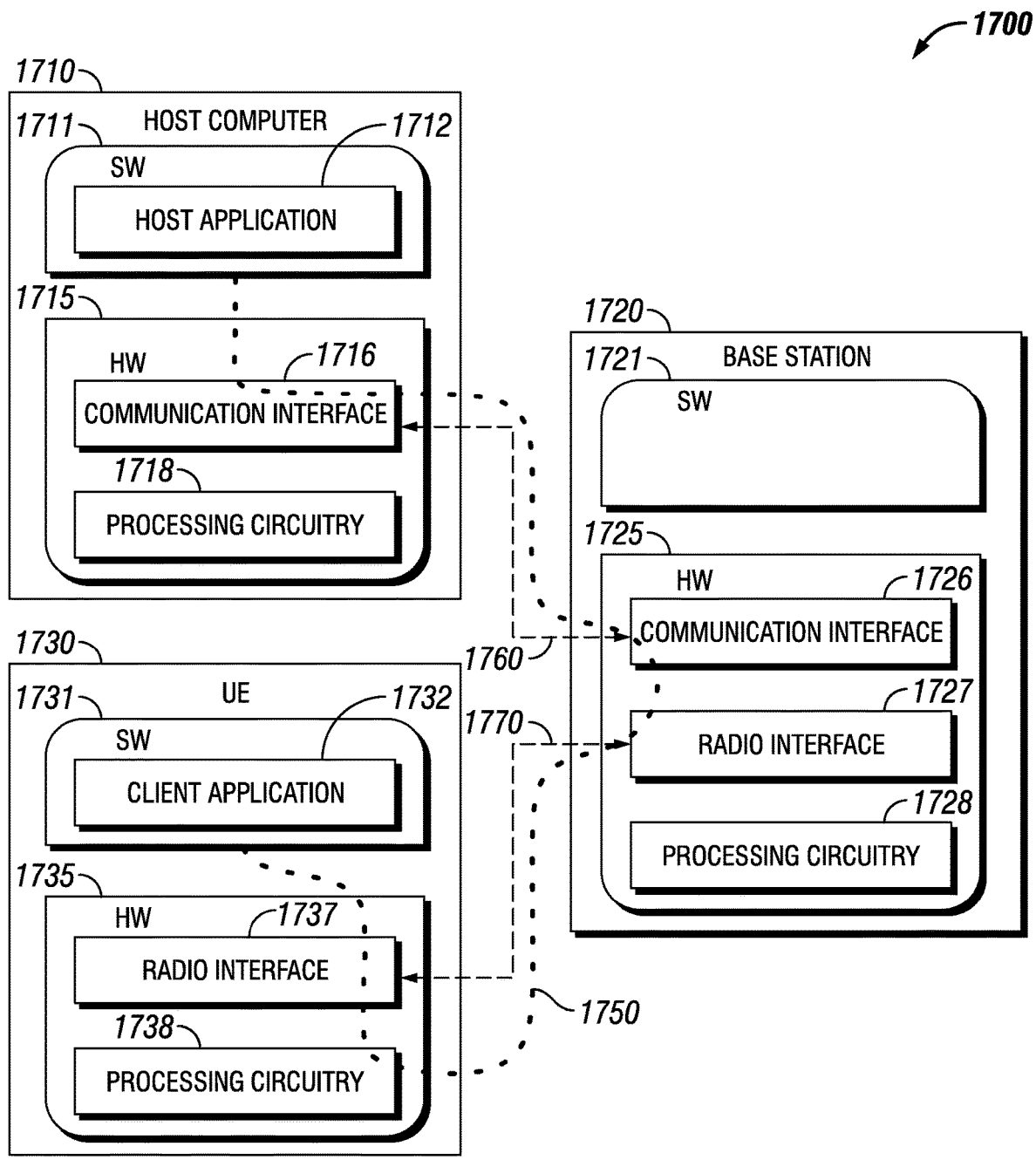
FIG. 17 is a schematic diagram illustrating an example of a host computer communicating via a primary node/base station with a user equipment over a partially wireless connection in accordance with some embodiments.

FIG. 17 is a schematic diagram illustrating an example of a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 17. In communication system 1700, host computer 1710 comprises hardware 1715 including communication interface 1716 configured to set up and maintain a wired or wireless connection with an interface of a different communication device of communication system 1700. Host computer 1710 further comprises processing circuitry 1718, which may have storage and/or processing capabilities. In particular, processing circuitry 1718 may comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 may be operable to provide a service to a remote user, such as UE 1730 connecting via OTT connection 1750 terminating at UE 1730 and host computer 1710. In providing the service to the remote user, host application 1712 may provide user data which is transmitted using OTT connection 1750.

Communication system 1700 further includes base station 1720 provided in a telecommunication system and comprising hardware 1725 enabling it to communicate with host computer 1710 and with UE 1730. Hardware 1725 may include communication interface 1726 for setting up and maintaining a wired or wireless connection with an interface of a different communication device of communication system 1700, as well as radio interface 1727 for setting up and maintaining at least wireless connection 1770 with UE 1730 located in a coverage area (not shown in FIG. 17) served by base station 1720. Communication interface 1726 may be configured to facilitate connection 1760 to host computer 1710. Connection 1760 may be direct or it may pass through a core network (not shown in FIG. 17) of the telecommunication system and/or through one or more intermediate networks outside the telecommunication system. In the embodiment shown, hardware 1725 of base station 1720 further includes processing circuitry 1728, which may comprise one or more programmable processors, application-specific integrated circuits, field programmable gate arrays or combinations of these (not shown) adapted to execute instructions. Base station 1720 further has software 1721 stored internally or accessible via an external connection.

Communication system 1700 further includes UE 1730 already referred to. The hardware 1735 may include radio interface 1737 configured to set up and maintain wireless connection 1770 with a base station serving a coverage area in which UE 1730 is currently located. Hardware 1735 of UE 1730 further includes processing circuitry 1738, which may comprise one or more programmable processors, application-specific integrated circuits, field programmable gate arrays or combinations of these (not shown) adapted to execute instructions. UE 1730 further comprises software 1731, which is stored in or accessible by UE 1730 and executable by processing circuitry 1738. Software 1731 includes client application 1732. Client application 1732 may be operable to provide a service to a human or non-human user via UE 1730, with the support of host computer 1710. In host computer 1710, an executing host application 1712 may communicate with the executing client application 1732 via OTT connection 1750 terminating at UE 1730 and host computer 1710. In providing the service to the user, client application 1732 may receive request data from host application 1712 and provide user data in response to the request data. OTT connection 1750 may transfer both the request data and the user data. Client application 1732 may interact with the user to generate the user data that it provides.

It is noted that host computer 1710, base station 1720 and UE 1730 illustrated in FIG. 17 may be similar or identical to host computer 1630, one of base stations 1612a, 1612b, 1612c and one of UEs 1691, 1692 of FIG. 16, respectively. This is to say, the inner workings of these entities may be as shown in FIG. 17 and independently, the surrounding network topology may be that of FIG. 16.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure may determine the routing, which it may be configured to hide from UE 1730 or from the service provider operating host computer 1710, or both. While OTT connection 1750 is active, the network infrastructure may further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout this disclosure. One or more of the various embodiments improve the performance of OTT services provided to UE 1730 using OTT connection 1750, in which wireless connection 1770 forms the last segment. More precisely, the teachings of these embodiments may improve the time of arrival of the data in the UE and thereby provide benefits of an increased user experience for a user of a UE streaming data.

A measurement procedure may be provided for the purpose of monitoring data rate, latency and other factors on which the one or more embodiments improve. There may further be an optional network functionality for reconfiguring OTT connection 1750 between host computer 1710 and UE 1730, in response to variations in the measurement results. The measurement procedure and/or the network functionality for reconfiguring OTT connection 1750 may be implemented in software 1711 and hardware 1715 of host computer 1710 or in software 1731 and hardware 1735 of UE 1730, or both. In embodiments, sensors (not shown) may be deployed in or in association with communication devices through which OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of OTT connection 1750 may include message format, retransmission settings, preferred routing etc.; the reconfiguring need not affect base station 1720, and it may be unknown or imperceptible to base station 1720. Such procedures and functionalities may be known and practiced in the art. In certain embodiments, measurements may involve proprietary UE signaling facilitating host computer 1710's measurements of throughput, propagation times, latency and the like. The measurements may be implemented in that software 1711 and 1731 causes messages to be transmitted, in particular empty or 'dummy' messages, using OTT connection 1750 while it monitors propagation times, errors etc.

Figure 18:
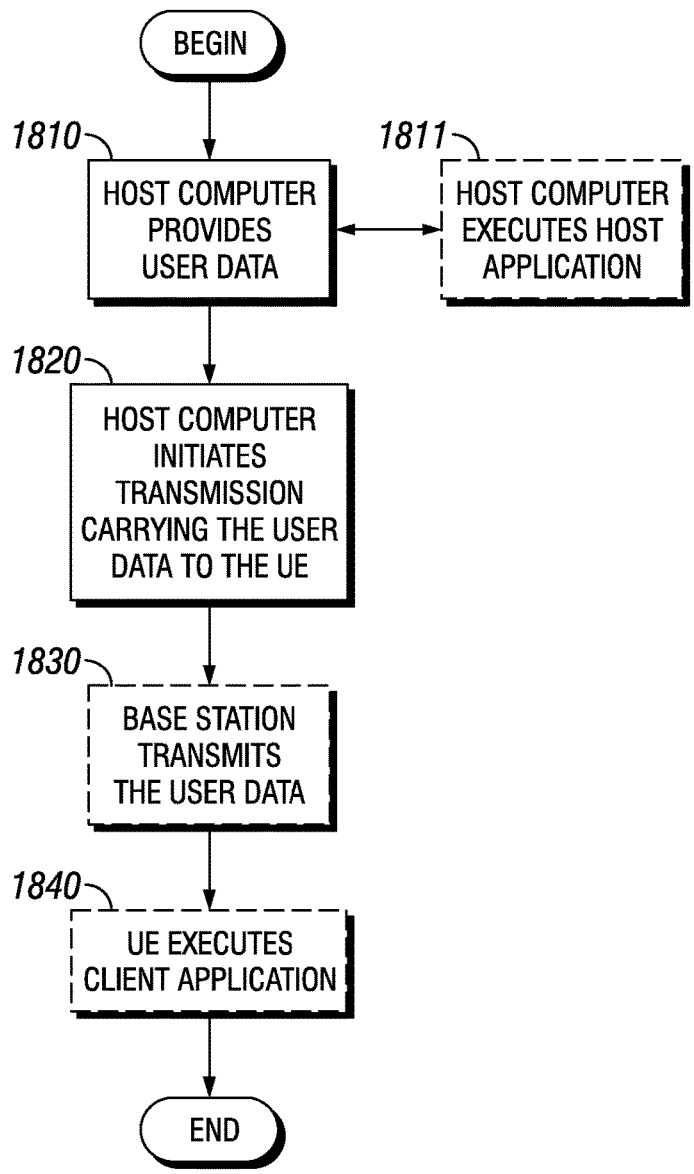
FIGS. 18-19 are schematic flow diagrams illustrating examples of methods implemented in a communication system including, e.g. a host computer, and optionally also a primary node/base station and a user equipment in accordance with some embodiments.
Figure 19:
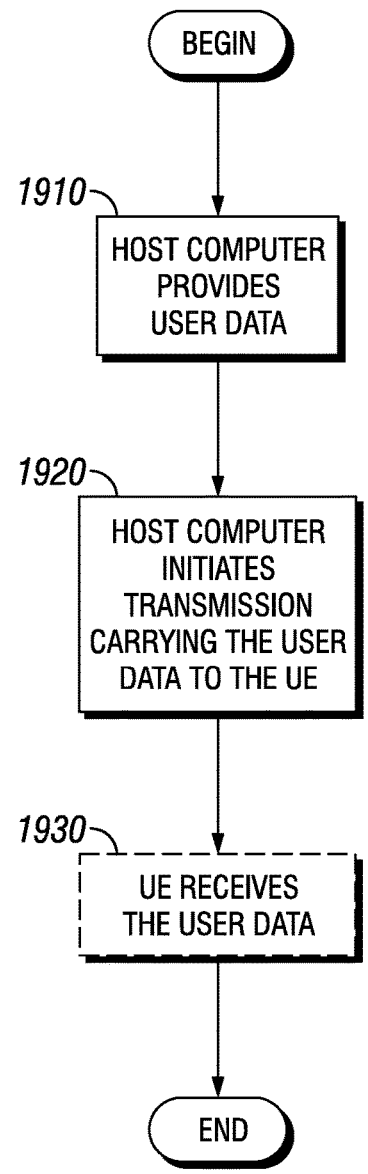

FIGS. 18-19 are schematic flow diagrams illustrating examples of methods implemented in a communication system including, e.g. a host computer, and optionally also a base station and a user equipment in accordance with some embodiments.

FIG. 18 is a flowchart illustrating a method implemented in a communication system, in accordance with one embodiment. The communication system includes a host computer, a base station and a UE which may be those described with reference to FIG. 16 and FIG. 17. For simplicity of the present disclosure, only drawing references to FIG. 18 will be included in this section. In step 1810, the host computer provides user data. In substep 1811 (which may be optional) of step 1810, the host computer provides the user data by executing a host application. In step 1820, the host computer initiates a transmission carrying the user data to the UE. In step 1830 (which may be optional), the base station transmits to the UE the user data which was carried in the transmission that the host computer initiated, in accordance with the teachings of the embodiments described throughout this disclosure. In step 1840 (which may also be optional), the UE executes a client application associated with the host application executed by the host computer.

FIG. 19 is a flowchart illustrating a method implemented in a communication system, in accordance with one embodiment. The communication system includes a host computer, a base station and a UE which may be those described with reference to FIG. 16 and FIG. 17. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission may pass via the base station, in accordance with the teachings of the embodiments described throughout this disclosure. In step 1930 (which may be optional), the UE receives the user data carried in the transmission.

Figure 20:
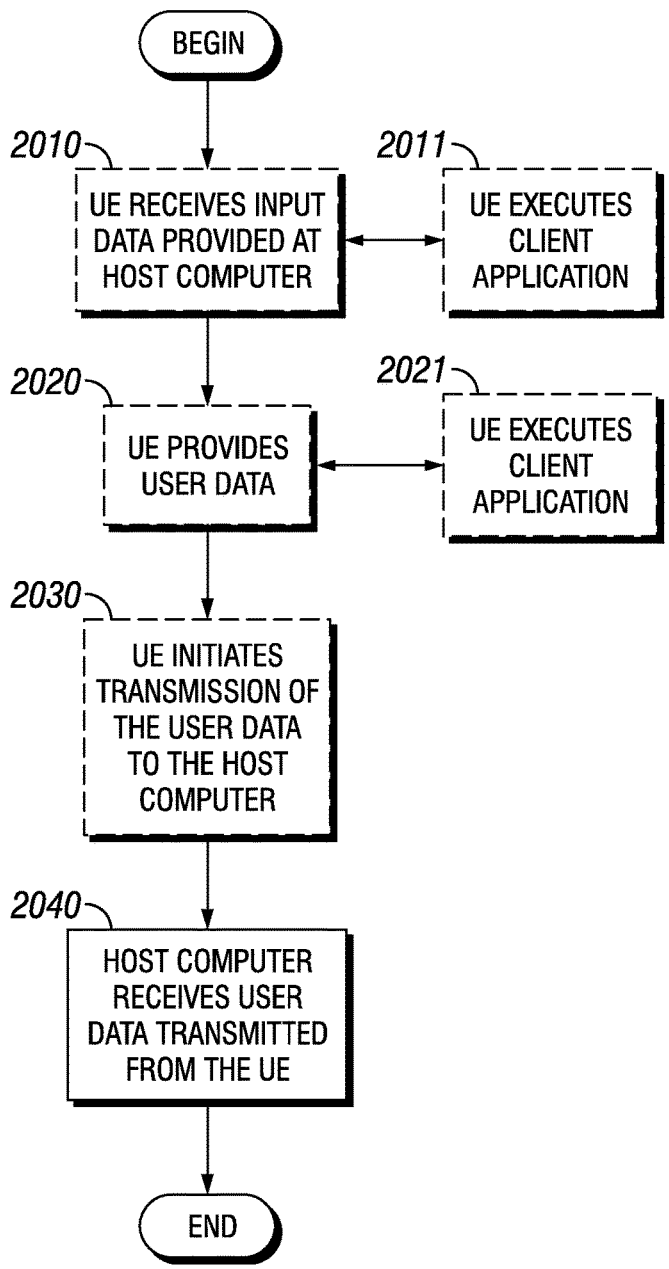
FIGS. 20-21 are schematic diagrams illustrating examples of methods implemented in a communication system including a host computer, a primary node/base station and a user equipment in accordance with some embodiments.
Figure 21:
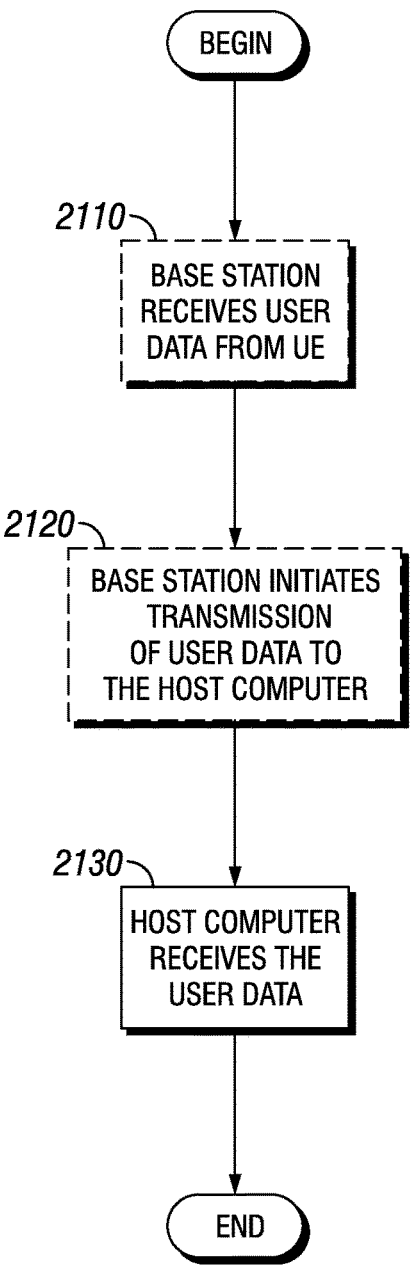

FIGS. 20-21 are schematic diagrams illustrating examples of methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIG. 16 and FIG. 17. For simplicity of the present disclosure, only drawing references to FIG. 20 will be included in this section. In step 2010 (which may be optional), the UE receives input data provided by the host computer. Additionally or alternatively, in step 2020, the UE provides user data. In substep 2021 (which may be optional) of step 2020, the UE provides the user data by executing a client application. In substep 2011 (which may be optional) of step 2010, the UE executes a client application which provides the user data in reaction to the received input data provided by the host computer. In providing the user data, the executed client application may further consider user input received from the user. Regardless of the specific manner in which the user data was provided, the UE initiates, in substep 2030 (which may be optional), transmission of the user data to the host computer. In step 2040 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station and a UE which may be those described with reference to FIG. 16 and FIG. 17. For simplicity of the present disclosure, only drawing references to FIG. 21 will be included in this section. In step 2110 (which may be optional), in accordance with the teachings of the embodiments described throughout this disclosure, the base station receives user data from the UE. In step 2120 (which may be optional), the base station initiates transmission of the received user data to the host computer. In step 2130 (which may be optional), the host computer receives the user data carried in the transmission initiated by the base station.

In the following, examples of illustrative and non-limiting embodiments will be given:

There is provided a method performed by a network node such as a base station as described herein.

Optionally, the method further comprises:
obtaining user data; and
forwarding the user data to a host computer or a wireless device.

There is also provided a network node such as a base station comprising processing circuitry configured to perform any of the steps of the method described herein.

There is further provided a communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of the method described herein.

In a particular example embodiment, the communication system further includes the base station.

In yet another example embodiment, the processing circuitry of the host computer is configured to execute a host application, thereby providing the user data; and the UE comprises processing circuitry configured to execute a client application associated with the host application.

There is also provided a method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of the method described herein.

In a particular example embodiment, the method further comprises, at the base station, transmitting the user data.

In yet another example embodiment, the user data is provided at the host computer by executing a host application, and the method further comprises, at the UE, executing a client application associated with the host application.

There is further provided a communication system including a host computer comprising a communication interface configured to receive user data originating from a transmission from a user equipment (UE) to a base station, wherein the base station comprises a radio interface and processing circuitry, the base station's processing circuitry configured to perform any of the steps of the method described herein.

In a particular example, the communication system includes the base station.

In yet another example embodiment, the communication system further includes the UE, wherein the UE is configured to communicate with the base station.

By way of example, the processing circuitry of the host computer may be configured to execute a host application; and the UE may be configured to execute a client application associated with the host application, thereby providing the user data to be received by the host computer.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

APPENDIX A

Automatic Control Terminology

As a start, a number of representations of a dynamic process need to be introduced. A dynamic process is one where the output depends not only on the present input signal but also of previous inputs and outputs. Put otherwise, the dynamic process has memory. The most basic dynamic process is the linear one that can be described by a differential equation as:

$$y^{(n)}(t)+a_1 y^{(n-1)}(t)+ \ldots +a_n y(t)=b_0 u^{(m)}(t)+ \ldots +b_m u(t). \quad (A1)$$

Here $y(t)$ is the output signal, $u(t)$ is the input signal, $t$ is the time, while $a_i$ $i=1 \ldots n$ and $b_j$ $j=0, \ldots, m$ are constant parameters. (i) denotes differentiation with respect to time i times. The above differential equation has order n. It has one input signal and one output signal. For simplicity all concepts are explained in this context, but the generalization to more than one input signal and more than one input signal is available in prior art textbooks.

By taking Laplace transforms and setting initial values to zero, the differential equation is transformed to be represented by a transfer function H(s), where s denotes the Laplace transform variable which is closely related to the angular frequency used in Fourier transforms. The result is:

$$H(s) = \frac{B(s)}{A(s)} = \frac{b_0 s^m + b_1 s^{m-1} + \ldots + b_m}{s^n + a_1 s^{n-1} + \ldots + a_n}. \quad (A2)$$

The relation between the output signal and input signal Laplace transforms Y(s) and U(s) are:

$$Y(s)=H(s)U(s). \quad (A3)$$

The poles $p_i$ $i=1, \ldots, n$ of the process are given by the equation $A(s)=0$. For simplicity only strictly stable (open loop) processes with all poles in the left complex half plane is considered here. In general poles are real or complex conjugate pairs.

The properties of the dynamic process can also be studied in the frequency domain in terms of complex valued frequency functions $Y(j\omega)$, $H(j\omega)$ and $U(j\omega)$. $\omega$ denotes the angular frequency that fulfils:

$$\omega=2\pi f, \quad (A4)$$

where f is the frequency in Hz. Below, frequency is used for angular frequency.

Finally, the concept of feedback is illustrated by FIG. 2, where $F_y(s)$ is the feedback gain. The closed loop system is then computed as follows:

$$Y(s)=W(s)+H(s)F_y(s)(Y_{ref}(s)-Y(s)), \quad (A5)$$

which gives:

$$Y(s) = \frac{F_y(s)H(s)}{1+F_y(s)H(s)} Y_{ref}(s) + \frac{1}{1+F_y(s)H(s)} W(s). \quad (A6)$$

This gives the effect of the reference signal and the disturbance on the output.

e denotes control error.

The remaining definitions now follow as:

The closed loop bandwidth $\omega_{CL}$ of the control system is given by the equation:

$$\left| \frac{F_y(j\omega_{CL})H(j\omega_{CL})}{1+F_y(j\omega_{CL})H(j\omega_{CL})} \right|^2 = \frac{1}{2} \left| \frac{F_y(0)H(0)}{1+F_y(0)H(0)} \right|^2. \quad (A7)$$

The closed loop static error of the control system is given by the equation:

$$y_{ref} - y = \frac{1}{1+F_y(0)H(0)} (y_{ref} - w). \quad (A8)$$

The static disturbance rejection of the control system is given by the static sensitivity function:

$$S(0) = \frac{1}{F_y(0)H(0)}. \quad (A9)$$

The dynamic disturbance rejection of the control system is determined by the sensitivity function:

$$S(j\omega) = \frac{1}{1 + F_y(j\omega)H(j\omega)}. \quad (A10)$$

The complimentary sensitivity function of the control system, $T(j\omega)=1-S(j\omega)$ determines the robustness of the control system with respect to un-modeled dynamics.

ABBREVIATIONS

ASIC Application Specific Integrated Circuits
BTS Base Transceiver Stations
CD Compact Disc
COTS Common Off-The-Shelf
CPE Customer Premises Equipment
CPU Central Processing Units
DSP Digital Signal Processors
DVD Digital Versatile Disc
eNB evolved Node B
FPGA Field Programmable Gate Arrays
HDD Hard Disk Drive
HW hardware
I/O input/output
LEE Laptop Embedded Equipment
LME Laptop Mounted Equipment
MEM memory units
ND Network Device
NFV Network Function Virtualization
NI Network Interfaces
NIC Network Interface Controller
OS Operating System
OSS Operations and Support System
PC Personal Computer
PDA Personal Digital Assistant
PLC Programmable Logic Controllers
RAM Random Access Memory
REG registers
ROM Read-Only Memory
RRU Remote Radio Units
STA Station
SW software
UE User Equipment
USB Universal Serial Bus
VM Virtual Machine
VMM Virtual Machine Monitor
VNE Virtual Network Element
WNIC Wireless Network Interface Controller

The invention claimed is:

1. A method for controlling multi-point data transmission between a primary node and a User Equipment (UE) via secondary nodes, the method comprising the steps of:
obtaining Round-Trip Time (RTT) values between a primary node and two or more secondary nodes;
determining a time value relationship between uplink and downlink for each of the obtained RTT values;
determining a first queue dwell time in a first secondary node of the two or more secondary nodes; and
determining a second queue dwell time in a second secondary node of the two or more secondary nodes, the second queue dwell time being determined at least partly based on the RTT values, the time value relationship, and the determined first queue dwell time; and
initiating control of the first and second queue dwell times for synchronized data arrival in the UE.

2. The method of claim 1, wherein the step of determining a time value relationship comprises setting the time value relationship to a value that is the same for all obtained RTT values.

3. The method of claim 1, wherein the step of determining a time value relationship comprises setting the time value relationship, wherein the time value relationship is determined individually for each obtained RTT value.

4. The method of claim 1, wherein the time value relationship is determined in dependence of the network load.

5. The method of claim 1, wherein the step of determining the first queue dwell time in the first secondary node comprises:
determining a downlink transmission time value between the primary node and the first secondary node using the obtained RTT value between the primary node and the first secondary node and the determined time value relationship;
determining a downlink delay reference value between the primary node and the UE; and
subtracting the determined downlink transmission time value between the primary node and the first secondary node from the determined downlink delay reference value.

6. The method of claim 1, wherein the step of determining the second queue dwell time in the second secondary node comprises:
determining a downlink delay reference value between the primary node and the UE;
determining a downlink transmission time value between the primary node and the second secondary node, using the obtained RTT value between the primary node and the second secondary node, and the determined time value relationship; and
subtracting the determined downlink transmission time value between the primary node and the first secondary node from the determined downlink delay reference value.

7. The method of claim 5, wherein the step of determining the downlink delay reference value between the primary node and the UE comprises setting the downlink delay reference value to be equal to or larger than a sum of the obtained RTT value between the primary node and the first secondary node, and the determined downlink transmission time value between the primary node and the first secondary node.

8. The method of claim 1, wherein the step of obtaining RTT values is performed at periodic intervals in the primary node and at the same time instance for each path to/from the two or more secondary nodes.

9. The method of claim 1, wherein the method is performed in the primary node.

10. The method of claim 1, wherein the primary node is not time synchronized with at least one of the two or more secondary nodes.

11. A network node in a multi-point transmission network configured to control multi-point transmission between a primary node and a User Equipment (UE) via secondary nodes, the network node comprising a processor and a memory, the memory storing computer program instructions for execution by the processor whereby the network node is configured to:
- obtain Round-Trip Time (RTT) values between a primary node and two or more secondary nodes;
- determine a time value relationship between uplink and downlink for each of the obtained RTT values;
- determine a first queue dwell time in a first secondary node of the two or more secondary nodes; and
- determine a second queue dwell time in a second secondary node of the two or more secondary nodes, the second queue dwell time being determined at least partly based on the RTT information, the time value relationship, and the determined first queue dwell time; and
- initiate control of the first and second queue dwell times for synchronized data arrival in the UE.

12. The network node of claim 11, wherein the network node is further configured to set the time value relationship to a value that is the same for all obtained RTT values.

13. The network node of claim 11, wherein the network node is further configured to set the time value relationship, wherein the time value relationship is determined individually for each obtained RTT value.

14. The network node of claim 11, wherein the network node is further configured to determine the time value relationship in dependence of the network load.

15. A non-transitory computer-readable storage medium, having stored thereon a computer program comprising instructions, which when executed by at least one processor, cause the at least one processor to perform a method for controlling multi-point data transmission between a primary node and a User Equipment (UE) via secondary nodes, the computer program comprising instructions for:
- obtaining Round-Trip Time (RTT) values between a primary node and two or more secondary nodes;
- determining a time value relationship between uplink and downlink for each of the obtained RTT values;
- determining a first queue dwell time in a first secondary node of the two or more secondary nodes; and
- determining a second queue dwell time in a second secondary node of the two or more secondary nodes, the second queue dwell time being determined at least partly based on the RTT values, the time value relationship, and the determined first queue dwell time; and
- initiating control of the first and second queue dwell times for synchronized data arrival in the UE.

* * * * *